United States Patent
Douglass et al.

(10) Patent No.: US 7,673,309 B2
(45) Date of Patent: Mar. 2, 2010

(54) SCALABLE INTEGRATED HIGH DENSITY OPTICAL DATA/MEDIA STORAGE DELIVERY SYSTEM

(75) Inventors: Robert Burns Douglass, McKinney, TX (US); Thomas Marshall Humm, McKinney, TX (US); John Aden Mosher, Longmont, CO (US)

(73) Assignee: Hie Electronics, Inc., McKinney, TX (US)

( * ) Notice: Subject to any disclaimer, the term of this patent is extended or adjusted under 35 U.S.C. 154(b) by 669 days.

(21) Appl. No.: 11/303,778

(22) Filed: Dec. 16, 2005

(65) Prior Publication Data

US 2006/0161928 A1 Jul. 20, 2006

Related U.S. Application Data

(60) Provisional application No. 60/645,102, filed on Jan. 20, 2005.

(51) Int. Cl.
G11B 17/04 (2006.01)
G11B 17/22 (2006.01)

(52) U.S. Cl. .................. 720/721; 369/30.52; 369/30.53; 369/30.55; 369/30.57

(58) Field of Classification Search ................. 720/619, 720/620, 621, 622; 360/92.1; 369/30.38, 369/30.51, 30.52, 30.53, 30.55, 30.57, 30.61
See application file for complete search history.

(56) References Cited

U.S. PATENT DOCUMENTS 3,008,721 A    11/1961    Corbett et al.
4,512,469 A    4/1985     West
4,527,262 A    7/1985     Manto
4,567,584 A    1/1986     Kawakami
4,714,157 A    12/1987    Morrone
4,724,495 A    2/1988     Hedberg et al.
4,734,814 A    3/1988     Fujino et al.
5,235,579 A    8/1993     Ross
5,267,225 A *  11/1993    Fukasawa et al. ........ 369/30.85
5,274,620 A    12/1993    Sipos
5,307,331 A    4/1994     d'Alayer de Costemore
5,402,283 A *  3/1995     Yamakawa et al. ......... 360/92.1
5,412,791 A    5/1995     Martin et al.
5,431,520 A *  7/1995     Brugger ...................... 414/277

(Continued)

FOREIGN PATENT DOCUMENTS

EP          0716370 A2    6/1996

(Continued)

OTHER PUBLICATIONS

Hewlett Packard, "HP z545-B Digital Entertainment Center.", Hewlett Packard (website), Nov. 1, 2004.

(Continued)

*Primary Examiner*—William J Klimowicz
(74) *Attorney, Agent, or Firm*—Winstead PC

(57) ABSTRACT

An apparatus and system for recording, playing, handling, and storing a plurality of media disks in a plurality of configurations and a device for moving any disk into and out of a media disk storage mechanism and into or out of a selected media player/recorder on demand, and a controller for directing operation of the device for moving the disks and controlling selection of operation of the media disk storage mechanism.

37 Claims, 17 Drawing Sheets

U.S. PATENT DOCUMENTS

| | | | |
|---|---|---|---|
| 5,561,658 A * | 10/1996 | Nakamichi et al. .......... 720/703 |
| 5,644,558 A | 7/1997 | Inatani et al. |
| 5,724,336 A | 3/1998 | Morton |
| 5,758,057 A | 5/1998 | Baba et al. |
| 5,808,828 A * | 9/1998 | Forrer et al. ............... 360/92.1 |
| 5,845,886 A | 12/1998 | McCormick |
| 5,859,825 A | 1/1999 | Kimura et al. |
| 5,886,974 A | 3/1999 | Bos et al. |
| 5,912,873 A * | 6/1999 | Bos et al. ................. 369/30.55 |
| 5,923,638 A * | 7/1999 | Watanabe ................... 720/668 |
| 5,988,431 A | 11/1999 | Roe |
| 6,005,744 A | 12/1999 | Terashima |
| 6,154,574 A | 11/2000 | Paik et al. |
| 6,499,083 B1 | 12/2002 | Hamlin |
| 6,563,771 B1 | 5/2003 | Debiez |
| 6,564,231 B1 | 5/2003 | Yamada et al. |
| 6,574,174 B1 | 6/2003 | Amble et al. |
| 6,611,395 B1 | 8/2003 | Chainer et al. |
| 6,697,902 B1 | 2/2004 | Sugimoto |
| 6,758,346 B2 | 7/2004 | Kollegian |
| 6,763,953 B1 | 7/2004 | Pobee-Mensah |
| 6,788,488 B2 | 9/2004 | Antonio et al. |
| 6,801,713 B1 | 10/2004 | Yagawa et al. |
| 7,286,753 B2 | 10/2007 | Yamasaki |
| 2004/0032824 A1 | 2/2004 | Quiachon |
| 2004/0200918 A1 | 10/2004 | Davis |
| 2005/0050564 A1 * | 3/2005 | Araki ......................... 720/623 |
| 2005/0057847 A1 * | 3/2005 | Armagost et al. ............. 360/92 |
| 2005/0076377 A1 | 4/2005 | Nuell et al. |
| 2006/0093234 A1 | 5/2006 | Silverstein |

FOREIGN PATENT DOCUMENTS

| | | | |
|---|---|---|---|
| JP | 04132040 A * | 5/1992 |
| JP | 07111017 A * | 4/1995 |
| JP | 2000251371 A * | 9/2000 |
| JP | 2000268477 A * | 9/2000 |
| JP | 2000298908 A * | 10/2000 |
| JP | 2002367261 A * | 12/2002 |
| JP | 2005085342 A * | 3/2005 |
| JP | 2005116019 A * | 4/2005 |

OTHER PUBLICATIONS

JVC, "MC-8000LU Series Optical Disc Library: MC-8000LU with LVD SCSI Interface—Specification", JVC (website).

Koziol, Stephen, R. "International Search Report" for PCT/US06/01450 as mailed Jul. 17, 2008 (2 pages).

Adam, Norsiah, Search Report and Opinion of Singaporean Patent Application No. 200705372-1 as mailed Aug. 5, 2009 [8 pages].

* cited by examiner

SCALABLE INTEGRATED HIGH DENSITY OPTICAL DATA/MEDIA STORAGE DELIVERY SYSTEM

CROSS-REFERENCE TO RELATED APPLICATION

This application claims the benefit of U.S. Provisional Application No. 60/645,102, filed Jan. 20, 2005.

FIELD OF INVENTION

This invention pertains generally to systems, devices, and methods for digital data recording, storage, and retrieval. More specifically, the present invention relates to a data storage library system, device, and method for recording, cataloging, storing, searching, retrieving, and providing playback of large volumes of digital computer data such as, but not limited to audio, video, image and text data files utilizing multiple removable disk media stored in a media library.

BACKGROUND OF INVENTION

The high tech arena of today's video security, government security applications, home theater market, medical video and diagnostic imaging and records, and large and small data storage applications is ever growing and becoming more lucrative with each product placed in the marketplace. Any new emerging technology in this area offers opportunity for successful market entry. It is estimated that approximately 80% of the consumer electronics business are under $30 million dollars a year in sales. What is remarkable, however, is that in the current market no true TV/PC/DVD integrated, image capture terabyte and multi terabyte storage solution exists that meets the plethora of current and future government, medical, industrial and consumer needs.

The goal of HD-DVD is to present at least two hour long films in high definition video format at 1080p. Currently, DVD technology is limited to resolution of 480p. As a part of these limitations, the current DVD red laser technology is limited to 4.7 Gb of storage or 9.4 Gb using double sided or dual layer DVD. However, emerging blue laser systems will have the capability of storing capacities of 25 GB to 300 GB or greater per disk in the near future. Systems will be able to achieve 36 Mbps of transfer speed which equates to approximately 2 hours at 1080p resolution or 13 hours of 480p resolution for the 25 Gb disks. It is contemplated that 200 Gb dual layer disks and 300 Gb holographic optical storage will soon follow which will allow for even greater storage of recorded media.

Today, there exists a variety of audio compact disk (CD) and digital video disk (DVD) storage and handling apparatuses. Each apparatus configuration varies in shape and size and can range in shape from toroidal configurations to linear type cartridge stacks. Many typical digital media handling libraries seen today usually function as read only type devices. Sometimes these devices may include a number of areas for containing data cartridges positioned relative to a manipulating arm capable of maneuvering in front of a particular area which contains the desired cartridge to read. In the handling of digital data, especially where the recording and viewing of stored data is involved, data-access speed is sometimes very important to the user. The ability to specifically view recorded media content within a library and then to selectively retrieve and simultaneously play the selection would offer the user a tremendous benefit not currently available.

Optical information storage technologies have provided increasing storage densities over the years. The demand for larger volume optical storage devices has been persistent, and various approaches to increased optical storage have been considered. In addition, the retrieval of stored disk media has become a significant factor for consideration in view of the proliferation of various uses of these disks for data storage in association with various information that must be readily available. While individual disks are capable of accepting relatively large amounts of data, the amount of data stored for many applications is immense and therefore requires a significant number of disks. In addition to requiring large data storage capacity, rapid retrieval of disks is also desired so that data from the disks can be accessed more quickly.

There are various devices which store numerous recordable media, magnetically or optically, containing information therein in a magazine or magazines. The devices position the recordable media at a given location or locations inside the magazines and remove the same therefrom. An example of such a device is a disk changing apparatus. A disk changing apparatus typically stores a large number of disk-shaped recordable media such as CDs or DVDs in low density magazines and is provided with a drive read write unit for magnetically or optically recording onto and playing information stored on the disks. The disk changing apparatus is further adapted to set a disk from a magazine into the drive unit and insert a disk from the drive unit into a magazine. Many of these magazines have drawer supports for each disk.

One major factor in determining the efficiency of disk retrieval and delivery is found in the capabilities of the disk retrieval/loader apparatus to accomplish disk movement from and to storage libraries and drive mechanisms. Specifically, if the disk retrieval/loader apparatus is able to quickly retrieve, carry and deliver a disk, the data from that disk can be made available faster to the user. Thus, it is apparent that a need is present for a disk retrieval/loader apparatus that can retrieve and load disks in a timely and efficient manner. However, before the user can retrieve a disk he/she must be able to determine which disk a desired file is on. This is typically done through some form of manual searching within the stored files.

Specifically, for example in digital video recorder security systems, there are several methods of searching for programs recorded by a user or system. First, one method is to search while actually looking at a video by fast forwarding or rewinding a recorded program. Recent developments in digital video recorder software has allowed for faster searching by using camera number, time and date, or other metadata. These devices facilitate searching for a recorded segment of surveillance video or a TV program while listening to sound by doubling the image speed and maintaining the sound speed at a normal level.

Specifically, by way of example only, there are devices that facilitate searching for a TV program while listening to sound by doubling the image speed and maintaining the sound speed at a normal level. To increase the efficiency of retrieval, great efforts have recently been made to increase the fast forward speed and the rewind speed.

In prior methods, a user must look at the screen until he/she finds his/her desired program. Furthermore, fast forwarding and rewinding operations are complicated and troublesome. Such methods depend on user's intuition and memory. Particularly when a program is automatically recorded, user's intuition and memory cannot be relied upon any longer. As more and more video images are stored, the user's burden increases.

Other methods index video segments or recorded programs at the time of recording and searching for a desired program by displaying a list of the indices on the screen. Generally speaking, recording date and time are used as indices. It is considered that information which can be acquired as the attributes of a program by a video recorder are currently only recording date and time. In the video recorder, a list of the recording times and dates of TV programs is displayed on the screen so that a user can search for his/her desired program from the list while recollecting his/her recording date and time. However, in this method a video program must be searched utilizing an index and the user's burden is slightly lightened. But, since index information is only recording date and time, it can be said that this method also depends on the intuition and memory of a user. Particularly, when a program is automatically recorded, it is difficult to recall the contents of the recorded program from its recording date and time.

Along with the digitization of TV broadcasting, electronic information on TV programs is multiplexed in broadcasting and aired. This electronic program information is generally called EPG ("Electronic Program Guide"). EPG includes key words such as the title, category and performers of each program. Current digital satellite broadcasting enables a user to select his/her desired channel by displaying this EPG on the screen.

Another method is contained in the EPG and is used as retrieval indices. In this case, when a program is recorded, EPG is also stored. To see a recorded program, the titles of recorded programs are listed on the screen ad a user selects his/her desired program from this list. However, since EPG indicative of the contents of a program such as the title of a program is used as an index in the previous method, the burden of user's intuition and memory is greatly lightened. That is, the user searches for his/her desired program while looking at the titles of programs. However, when a large number of recorded programs can be stored, the titles of all the recorded programs cannot be displayed on the screen and the retrieval of indices becomes complicated. Further, it is difficult to recall the contents of automatically recorded programs from program information alone.

Along with the spread of digital broadcasting, various apparatuses for recording digital video will continue to come into existence. Since the high compression of digital video from digital video recorders is possible, a large number of video programs can be recorded. The connection of multiple video cameras used for capturing video images to this storage mechanism is possible.

Further, the program recording function will be improved by using the above mentioned EPG. For example, it will be possible to record a program by directly specifying the title of the program or to automatically record a program having a keyword by specifying the keyword included in program information such as the category or performer of the program. Particularly, the user's history of viewing is analyzed to automatically record a program which seems to be the favorite of the user.

The present invention, having an automatic recording function and the ability to store a large number of video, audio, and/or data files, is particularly effective as a media player, recorder, and library.

It is an object of the present invention to provide a system, apparatus, and method for playing, recording, storing, and/or cataloging a large-volume library of media files recorded on a digital media storage disk.

It is an object of the present invention to provide a system, apparatus, and method for providing versatile video and/or program recording scheduling functions to programmably record from a plurality of selected video, multiple input cameras, and/or audio input sources.

It is an object of the present invention to provide a system, apparatus, and method for capturing, recording, storing, retrieving, and manipulating digital media image files on storage disks into and out of a disk drive and/or a disk storage mechanism for recording and/or playback.

It is an object of the present invention to provide a system, apparatus, and method for retrieving and manipulating digital media storage disks into and out of a disk drive and/or multiple disk drives and/or a disk storage mechanism for recording and/or playback.

It is another object of the present invention to provide a system, apparatus, and method for searching for a user's specific desired file from a large number of previously recorded audio, video, or data files and then providing playback quickly and efficiently.

SUMMARY OF INVENTION

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. Other objects, advantages and novel features of the invention will become apparent from the following detailed description of the invention when considered in conjunction with the drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The system in accordance with at least one embodiment of the present invention comprises a moving X, Y, Z, and θ axis, top or bottom mounted, gantry pick and place type mechanism comprising a disk manipulator/extractor assembly specifically designed to manipulate, insert and/or extract at least CD or DVD disk media from disk media magazines using only the rim edges of the disk media. This X, Y, Z, and θ axis gantry mechanism can transport the disk media after extraction from a media magazine to one of a plurality of read/write drives located within the system of the present invention, a digital video recorder, other record and playback mechanism, or another disk media magazine. A software application monitor (i.e. a "data monitor") of any software application continually observes the record and playback functions and controls the read/write functions to achieve data disk cataloging and meta-data labeling. A library controller manages and coordinates the operation of a plurality of media player/recorder units operation of the disk manipulator mechanism, and operation of a plurality of stacked media magazines and associated media disks.

The system further comprises a housing for containing a plurality of media disks in a removable stacked media magazine configuration for access by the present invention. A library controller manages and coordinates the operation of a plurality of media player/recorder units, operation of the removable stacked media magazine, associated media disks, and a media disk manipulator mechanism.

Other various features of novelty which characterize the invention are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. It is intended that all such additional systems, methods, features, and advantages be included within this description, be within the scope of the present invention, and be protected by the accompanying claims.

These and other objects, features and advantages of the present invention will be more readily apparent when considered in connection with the following, detailed description of preferred embodiments of the invention, which description is presented in conjunction with annexed drawings below.

BRIEF DESCRIPTION OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

The present invention is embodied in a Scalable Integrated High Density Optical Data/Media Storage and Delivery System as shown in the accompanying figures. Before describing a specific embodiment of the present invention, the following information provides a general overview of the capability provided by the embodiments described hereinbelow. The present invention provides for an adaptable, scalable, high-capacity digital data recording, storing, cataloging, retrieving, and playback solution for individual user applications and to professional business security solution needs. In addition, the present invention provides all the benefits of highend DVR for security monitoring such as, but not limited to, high resolution real time video capture from 16 cameras per system, instant access to recent information—configurable up to several days, weeks, or months scalable to multiple clients, scalable storage archive for forensic research, searchable instantly via reduced quality video option, up to 8 months or more of full quality video accessible by system software and hardware in about 15 seconds, unlimited expandability via removable media disk magazines (described hereinbelow) re-mountable by an operator in minutes, provisionable for at least 4 clients or more, low power due to passive storage and non volatile media with about an 80 year lifetime.

Each application and use of the present invention has applicable importance in the surveillance and imaging of areas such as, but not limited to, airports, parking lots/garages, casinos, highways, public spaces, and other general areas.

Figure 1:
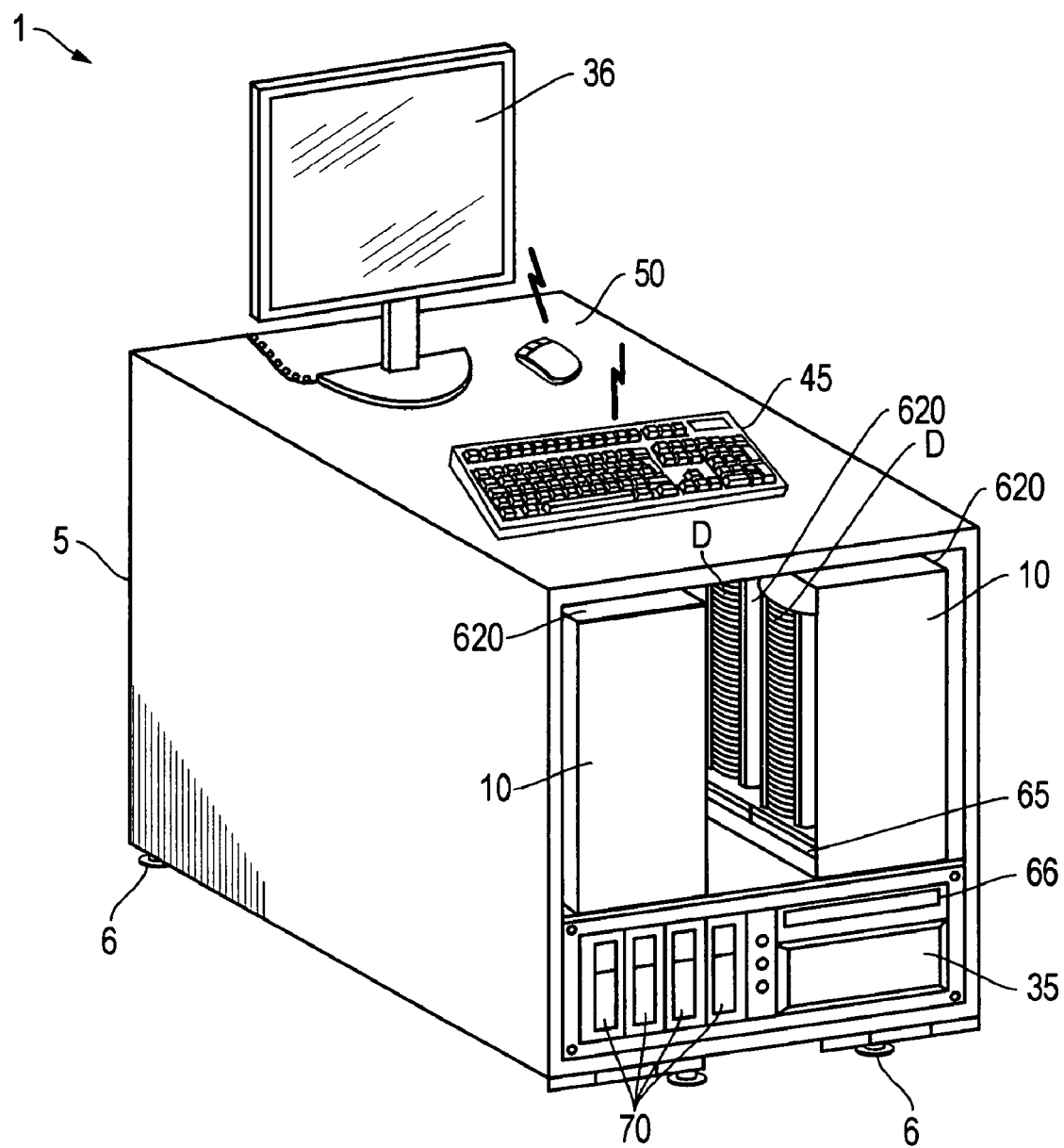
FIG. 1 is a perspective view of the system of the invention according to one embodiment of the present invention.

Now referring initially to FIG. 1, the system 1 according to one embodiment of the present invention provides a user with numerous options including, but not limited to, access to a plurality of stored digital media content. More specifically, for example, the user can record, catalogue, store, view, and/or playback disk media events including, but not limited to, surveillance system captured video from multiple cameras, television, music, movies, digital photos, home videos, scanned digital images of X-ray film, MRIs, CAT scan or other diagnostic records imagery, medical records, bank records, business documents, digital computer transaction records, video games, and text data. The system 1 can also be integrated and adapted to record, store, catalog, index, replay, and pause information recorded from, but not limited to, cable, digital cable, digital satellite, over-the-air TV and radio, and surveillance camera images. Furthermore, the present invention is compatible with a variety of optical digital media and is ideal for recording, archiving, playing and viewing media comprising text based documents to CAD data, high resolution images and digital audio/video files.

In FIG. 1, the system 1 according to the present invention comprises an outer housing unit main body 5 which has, but is not limited to, a generally square or rectangular-shaped main body having general dimensions of 22 inches wide by 30 to 90 inches high by 36 inches deep. One skilled in the art will readily understand that a plurality of shapes may be used to define the outer housing unit's main body 5. The outer housing unit main body 5 is leveled to its supporting surface by way of at least four (4) adjustable balancing legs/wheels 6. Examples of the body 5 that may be utilized by one embodiment of the present invention is a 19 inch 4U rack mount chassis manufactured by ANTEC® or a 4U ATX 22 inch rack mount case. An example of a mountable component size can be a 19 inch rack mount by 25 inches high by 24 inches deep. These examples of the body 5 are not meant to restrict or narrowly define the many various bodies that can be utilized with the present invention. Further enclosed within the main body 5 are a plurality of devices that comprise the internal components of the system 1 and apparatus of the present invention. Each component of the system 1 will now be briefly referenced for context within the system 1 below but will be further detailed hereinbelow with reference to FIGS. 2-15.

The outer housing unit 5 provides for operational storage and housing of a plurality of removable media disk magazines 620 that are removably and slidably attached to at least one slidably removable disk magazine drawer mechanism 10 having independent accompanying interfacing slides 11 to allow ease of access and insertion/removal of the plurality of removable media disk magazines 620. In one embodiment of the present invention a total of eight (8) removable media disk magazines 620 are utilized, wherein four removable media disk magazines 620 are positioned on each of two (2) slidably removable disk magazine drawer mechanisms 10. It will be understood by one skilled in the art that any number and combination of removable media disk magazines 620 and slidably removable disk magazine drawer mechanisms 10 can be configured for use without departing from the scope and spirit of the present invention. Specifically, multiple layers or attached inline slidably removable disk magazine drawer mechanisms 10 can be used to expand the overall storage capacity of the present system 1.

In further reference to FIG. 1, the system 1 of the present invention further comprises at least one, but preferably a plurality of, hot swappable media player/recorders 65, having either a slot in device or drawer, for the recording and playback of 4 gigabytes to 9.4 gigabytes on a single red-laser, DVD type media disk D or other DVD Disk technology such as, but not limited to, blue-laser-based or holographic disks. One embodiment of the system 1 comprises eight (8) media player/recorders 65 wherein one each media player/recorder 65 is disposed generally underneath each of the removable media disk magazines 620. However, in an alternate system embodiment (not shown), a plurality of media player/recorders 65 are functionally and operationally positioned in one end of the outer housing unit 5.

The media player/recorders 65 utilized with the system 1 of the present invention are of the type commercially available from a variety of manufacturers such as, but not limited to, Memorex, Panasonic, and Phillips. An example of such a media player/recorder 65 is, but not limited to, a Memorex 16× external dual layer DVD burner.

Furthermore, the present invention accommodates next generation DVD burners that will provide blue laser and smaller wavelengths of light based technology, thereby further expanding the present invention's capability such that a user may store at least twenty-thousand gigabytes of data on a single optical media disk D. In addition, the use of such next generation DVD recorders/burners will permit multiple layer disk technology that will accommodate the storage of information acquired and recorded by the present invention on a single media disk D of hundreds of thousands of gigabytes per media disk D.

The embodiment shown in FIG. 1 of the system 1 of the present invention further comprises a gantry device 100, as shown and described in detail hereinbelow in reference to at least FIGS. 10A and 11A, for permitting multi-axis translational movement of at least one servo controlled disk manipulator mechanism 20 (not shown in FIG. 1, see FIGS. 8, 9, 10A, 10B and 11A). The combination of the relationship and interaction of the gantry device 100 and at least one servo controlled disk manipulator mechanism 20, wherein the servo controlled disk manipulator mechanism 20 is uniquely designed and utilized to desirably manipulate (e.g., grasp, insert, remove, release, position and rotationally flip) optical media disks D from the removable media disk magazines 620 that are removably and slidably attached to at least one slidably removable disk magazine drawer mechanism 10. The servo controlled disk manipulator mechanism 20 is operationally and functionally controlled via bilateral communications between an I/O controller (not shown) such as, but not limited to, an ACS ServoII or Galil servo controller. The present invention's controller and computer system utilizes a programmed software code to achieve specific manipulation of a specific optical media disk D and to achieve desired translation of the gantry device 100 via a plurality of axis (e.g., X, Y, Z, and θ).

After the servo controlled disk manipulator mechanism 20 desirably manipulates the disk D from at least one of the slidably removable disk magazine drawer mechanism 10 and inserts the disk D into one of the media players/recorders 65, information signals such as, but not limited to, audio, video, and/or data signals are played back via the media player/recorder 65 which communicate through self-contained audio and video outputs to a user's selected video/audio components. Operation of an independent servo and I/O controller such as, but not limited to, the Galil controller; the media player/recorder 65; at least one front facing exteriorally installed media player/recorder 66 (as shown in FIG. 1) for manually inserting and extracting individual media disks D for playing, copying and or recording purposes separate and apart from the internal media players/recorders 65 associated with the removable media disk magazines 620 or positioned in one end of the outer housing unit 5 as described above and further hereinbelow; the slidably removable disk magazine drawer mechanism 10; the removable media disk magazines 620 and other components such as, but not limited to, a plurality of hard drive storage units 70 in a RAID array for terabyte capacity buffer storage are selected, programmably controlled, manipulated and operationally configured through user graphical user interface (GUI) devices such as, but not limited to a computer monitor 36 or the like or an exteriorly-installed LCD touch screen device 35 as shown in FIG. 1, or similar user interface. In addition, the present invention provides a mouse 50 (e.g., but not limited to, an optical mouse, IR mouse or other similar devices) for system configuration, operational inputs and programming.

In one embodiment, the system 1 comprises an 8" LCD ultra-thin video module for providing operator interface to control system functionality and operation, selection and viewing of various operational controls and programming features of the system 1. One example of use for the LCD touch screen device 35 a user can select and display a plurality of programming and unit options and functions on the LCD touch screen device 35. Furthermore, the GUI interfaces mentioned above provide for configuration of the stored information on the media disks D and in the overall library, for monitoring, archiving, cataloging, and media disk D burning parameter, communication parameters in a networked embodiment, player/recorder unit 65, 66 configurations and implementation of classes for all system 1 components. As mentioned above, the system 1 comprises an optical mouse 50 (shown in FIG. 1) that enables the user a point and click ability with the LCD touch screen device 35 and/or the computer monitor 36 using an interface menu screen (not shown) that is displayed on either or both the LCD touch screen device 35 and/or the computer monitor 36. In addition, a user has the alternate choice of pointing and selecting with his/her finger on the LCD touch screen device 35.

The user interface menu screen may be selectively operated and programmed by the user to record desired events such as, but not limited to, video camera event capture, audio playback/recording and still picture viewing. The user interface menu screen contains the most commonly used features of the system. All less commonly used features are displayed in secondary menus and screens. The user interface menu screen on the LCD touch screen device 35 and/or the computer monitor 36 utilizes icons and/or colors to indicate different attributes. A calendar is also provided and may be displayed in various positions on the LCD touch screen device 35 and/or the computer monitor 36 to permit the user to select, among other options, a desired camera, location, or other metadata selected that the system 1 is required to program from. It should be understood by one skilled in the art that the user interface menu screen layout is programmably configurable to display and allow interactive programming as desired by the user and such limited discussion herein is not meant to be limiting in the scope and use of the menu screen.

In further reference to FIG. 1, an example of the plurality of hard drive storage units 70 mentioned above that is utilized in one embodiment of the system 1, comprises a Western Digital SATA with 16 Mb Cache and 150 Mbps Corsair memory having a TWINX SMS3200 Dual Channel 1024 Mb DDR 400 Mhz (2×512) (TWINX1024-3200LLPT). The plurality of hard drive storage units 70 in one embodiment are arranged in a RAID array (utilizing a Promise Supertrack EX8350 8 Channel SATA PCI Express RAID Card) for effectively providing up to several terabytes of buffer storage. A single hard drive storage unit 70 of the system 1 provides for 250 gigabytes to 2 terabytes (or more) of hard drive storage. In addition, the system 1 also comprises RAM having about 512 megabytes up to about 2 gigabytes.

In further reference to FIG. 1, the system 1 and apparatus according to the present invention comprises within the main body 5 an Internet capable standard personal computer having a server motherboard such as, but not limited to a PCI Express motherboard (MSI K8N Neo4 Platinum) that provides improved PCI DATA traffic transferring wherein the motherboard has a minimum microprocessor speed of at least 3.0 gigahertz such as, but not limited to, an Intel® Pentium® 4, Xenon, or AMD Athlon® 64 processor. The computer utilized in at least one embodiment cooperates and operationally functions with Microsoft® Windows® XP, XP Professional, XP Embedded, Mediacenter®, Windows® 2000 or subsequent generations of Microsoft® operating systems. The Linux, UNIX or other standard Operating Systems may also be employed as part of the system 1 of the present invention.

In addition, the system 1 comprises a video card (not shown) such as, but not limited to a Sappphire Radeon X550 PCI Express video card and a plurality of digital video capture cards (not shown) to provide for direct connection to a plurality of video cameras (not shown) for video capture and recording purposes. Although not depicted in FIG. 1, the system 1 also comprises a plurality of audio and video input/output source jacks associated with the computer system. In addition, the system 1 comprises at least one VGA controller interface and at least one TV tuner card (both not shown).

Internet connectivity of the computer of the system 1 is made possible via Ethernet and WiFi connection ports associated and in functional operation with a plurality of peripheral ports such as USB, FireWire (IEEE 1394) and IR transmitters.

The main body 5 further comprises a plurality of, at least two, removable disk magazine drawer mechanisms 10 which therein provide a supporting base structure, wherein each drawer comprises at least four (4) USB port connections 90 (See FIG. 11A for general location reference) for slidably accommodating and communicably interacting with the plurality of removable stacked media magazines 620 (described hereinbelow in further detail) which can securely store a large number of media disks D, which herein are generally described as optical disks. However, one skilled in the art will recognize that future innovations in media disk technology can be accommodated by the present system 1 and its removable stacked media magazines 620. The embodiment of FIG. 1 provides for media disks D to be stored in a rectangular vertical magazine or other suitable configuration. However, it must be understood by one skilled in the art that various configurations including, but not limited to, rectangular, toroidal, oval, and accordion arrangements can be used within main body 5.

The system 1 of the present invention provides the capability in which recorded and non-recorded media disks D can be inserted into a media player/burner unit 65 for playback and/or recording of various media. After desired playback and/or recording is complete, the media disk D is then manipulated and removed from the media player/recording unit 65 by the disk manipulator mechanism 20 (described below in detail) and is selectively stored in a predetermined position in one of the removable stacked media magazines 620 which is removably positioned on at least one of the removable disk magazine drawer mechanism 10 contained within the main body 5. It should be understood by one skilled in the art that the present invention further allows for the manual insertion and removal of media disks for recording and/or playback functions via the front-facing exteriorally-installed media player/recorder 66.

Each of the above generally described components that comprise the system 1 of the present invention will now be described in detail hereinbelow. Although a component and/or device may not have been mentioned above in relation to the system 1 of the invention, such exclusion is not meant as a limiting factor to the overall makeup and structure of the entire system 1. For the sake of clarity and brevity each component and/or device not mentioned above will also be detailed hereinbelow.

With reference now to FIGS. 2 through 7, the present invention also discloses and utilizes a plurality of removable stacked media magazines 620 for storing a plurality of media disks D. Each removable stacked media magazine 620 is configured to accommodate at least a vertical stack of at least one-hundred (100) or more horizontally, inserted media disks D, such as a DVD or CD-ROM. Each media disk D is sufficiently horizontally separated in the stacked media magazine 620 to permit for insertion and extraction by way of the disk manipulator mechanism 20 as will be further described in detail hereinbelow in reference to at least FIGS. 8 through 11. It should be understood by one skilled in the art that the removable stacked media magazine 620 can also be configured for operation in a horizontal plane configuration within the system without departing from the scope and spirit of the present invention.

In one embodiment, the present invention comprises at least eight (8) removable stacked media magazines 620 wherein each can accommodate up to one hundred twenty five (125) media disks D. As such, the combined capacity of the plurality of each system's 1 removable stacked media magazines 620 can accommodate one thousand (1000) single sided and/or double sided media disks D totaling about 4.7 terabytes to about twenty (20) terabytes or more (TB) or equivalent to about eight (8) months of media event storage (e.g., images, video, data etc.) with the removable stacked media magazines 620 having the capability of providing a total useable shelf life of about eighty (80) years.

Figure 2:
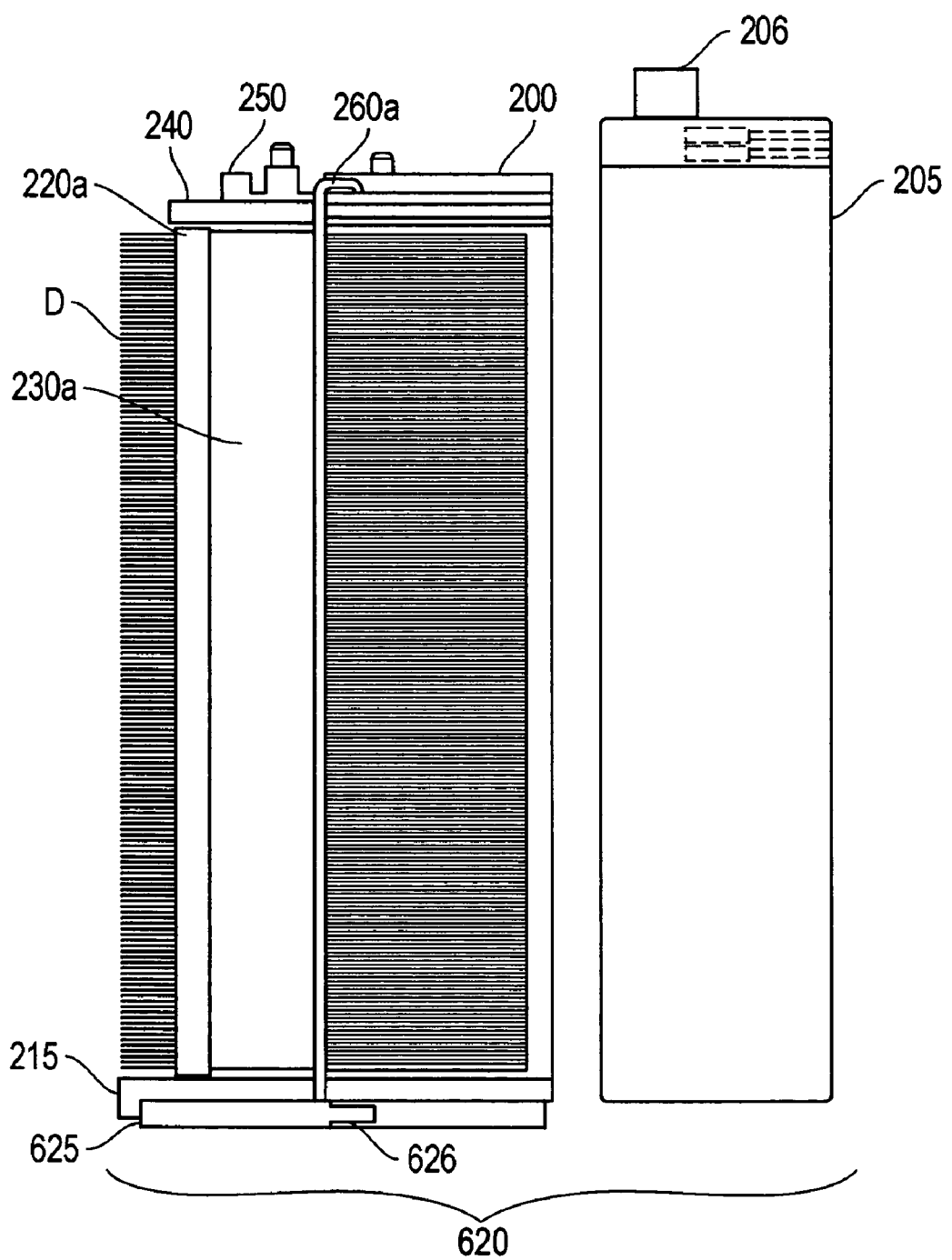
FIG. 2 a side elevation view of one embodiment of a removable stacked media magazine according to the present invention.
Figure 5:
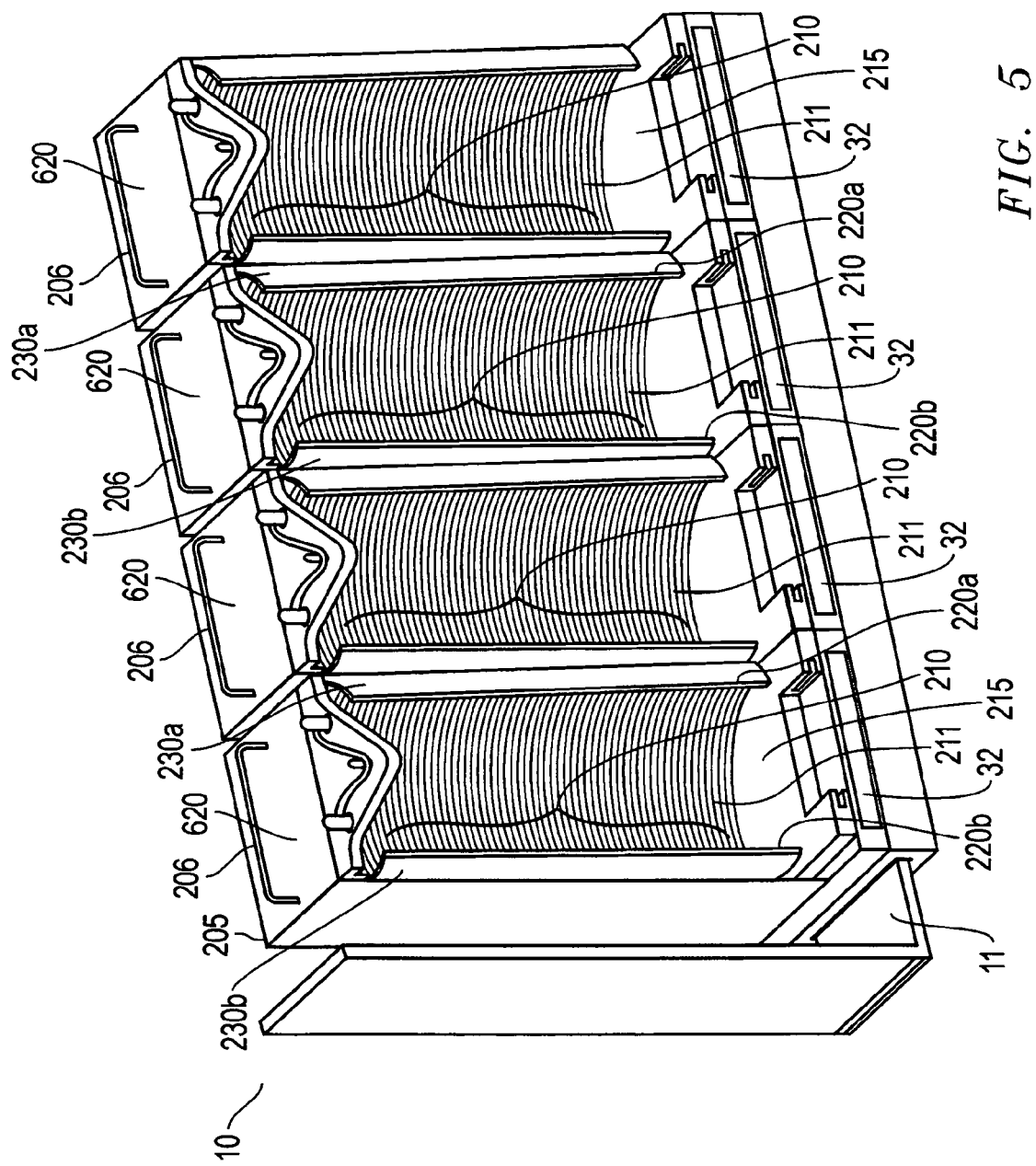
FIG. 5 is a perspective of one of the removable sliding drawers comprising a plurality of empty removable stacked media magazines disposed thereon according to the present invention.

The removable stacked media magazine 620 is constructed having a foundation 215 made from a metal or injection molded plastic, Delrin® acetal resin, or similar engineered plastic material, an injection molded plastic or stainless steel outer back frame 200 and having an interfacing removable injection molded plastic or stainless steel outer front access frame 205 with handle 206, wherein the removable outer front access frame 205 is so designed to be stowed away over the stainless steel outer back frame 200 of the removable stacked media magazine 620 when the magazine 620 is installed and in use in the system 1. When closed the outer front access frame 205 and the outer back frame 205 provide a dust free tight seal, FIG. 2 depicts the removable outer front access frame 205 in the removed position and to the rear of the removable stacked media magazine 620 but not yet mounted as described. In comparison, FIG. 5 depicts at least one of the removable stacked media magazines 620 in operational position disposed thereon the drawer slides 11 of one of the removable disk magazine drawer mechanisms 10, wherein the removable outer front access frame 205 of the removable stacked media magazine 620 is installed out of the way in its operational position within the system 1.

The removable stacked media magazine 620 also further comprises a molded or machined inner portion separation mechanism 210 that comprises a plurality of miniature shelves 211 (best seen in FIG. 5) for positionally separating and holding individual media disks D in place within the removable stacked media magazine 620. Each miniature shelf 211 is so designed to positionally retain at least one individual media disk D while the removable stacked media magazine 620 is positioned in its standard operational vertical use configuration with the removable outer front access frame 205 in place on the back side of the stainless steel outer back frame 200.

Figure 7:
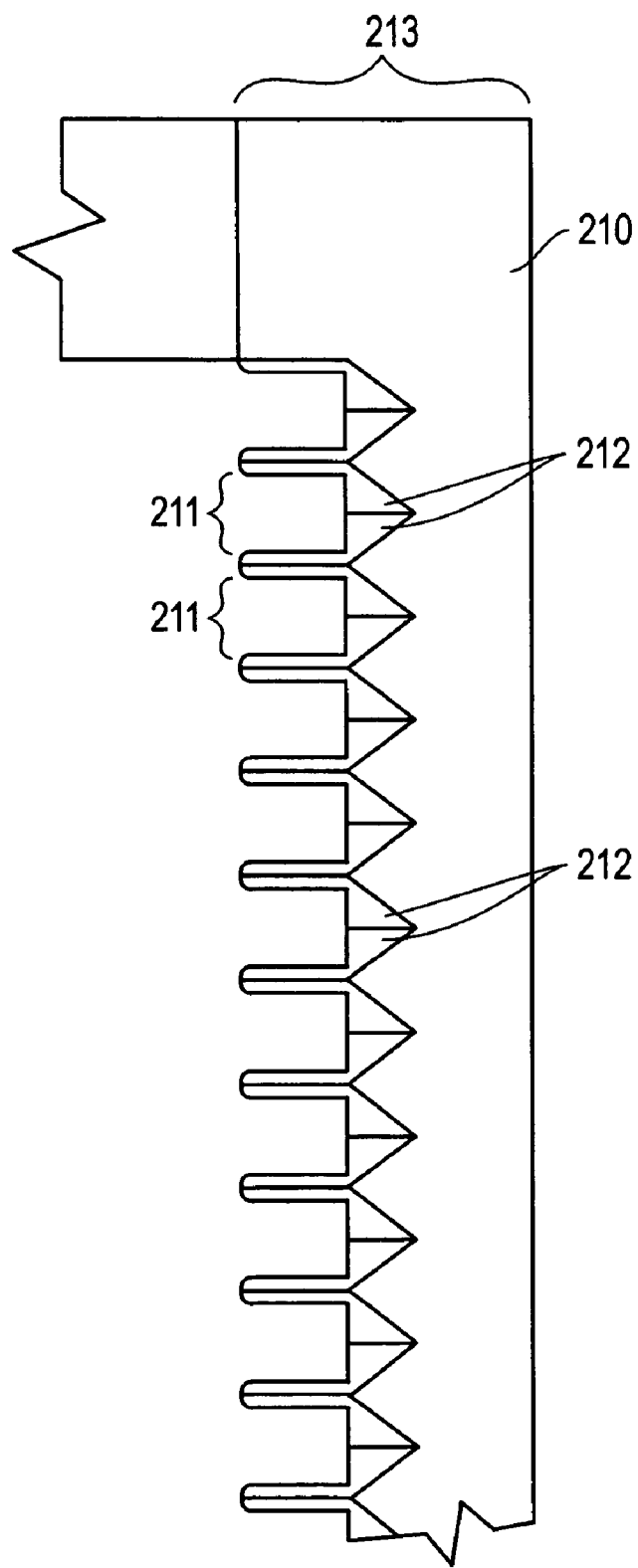
FIG. 7 is a segmented view of the chamfered portions of the machined inner portion separation mechanism of the removable stacked media magazine according to the present invention.

Furthermore, as shown in a segmented view of the machined inner portion separation mechanism 210 of the removable stacked media magazine 620, FIG. 7 depicts a plurality of machined chamfered surfaces 212 designed to predetermined tolerances to accommodate and provide successful insertion of a media disk D into each of the miniature shelves 211. The machined chamfered surfaces 212 are disposed thereabout an entry frontal edge region 213 of each of the separation mechanisms' 210 miniature shelves 211 that are together comprised in each removable stacked media magazine 620. Such chamfered surfacing allows for proper guidance of a media disk D into the desired miniature shelf 211 as is determined by the controller software of the system 1.

After insertion of the media disk D into the removable stacked media magazine 620, and therefore in operational storage configuration, each media disk D is securely, separationally and positionally retained within the miniature shelf 211 located on the inner portion separation mechanism 210 by way of further assistance from at least two retention wings 230a, 230b, wherein each retention wing 230a, 230b comprises a vertical separation comb bar 220a, 220b, respectively, distally disposed in a longitudinal fashion along an outer edge of each retention wing 230a, 230b. Each retention wing 230a, 230b in the present embodiment is constructed from an aluminum or stainless steel material. The vertical separation comb bars 220a, 220b are constructed from a Delrin® acetal resin material. However, one skilled in the art will recognize that any suitable materials may be utilized to construct the retention wings 230a, 230b and the vertical separation comb bars 220a, 220b without departing from the scope and spirit of the present invention.

Figure 3:
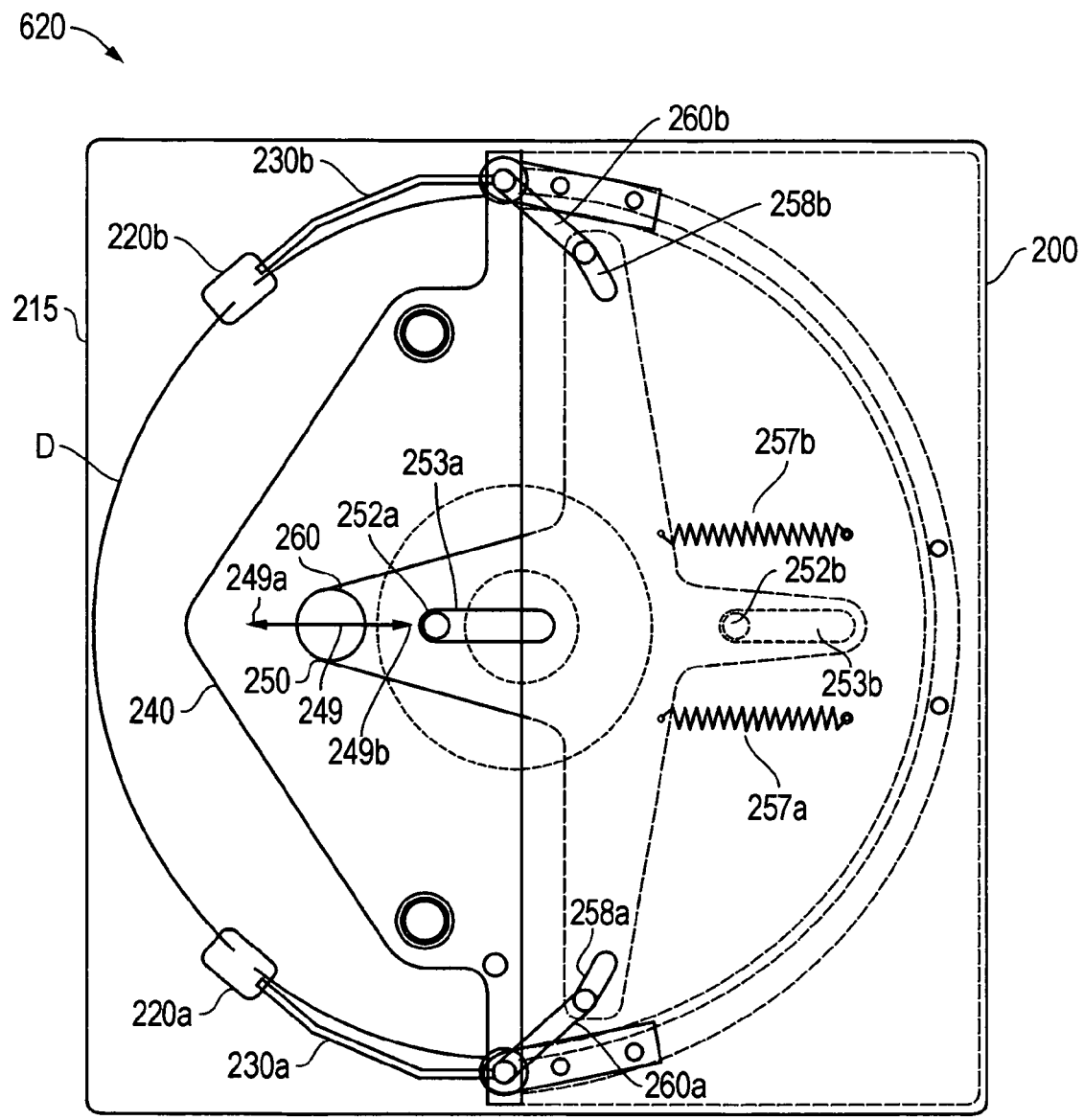
FIG. 3 is a is a top view of a removable stacked media magazine according to the present invention.

The two retention wings 230a, 230b and vertical separation comb bars 220a, 220b of the removable stacked media magazine 620, as shown in FIGS. 2, 3 and 5, are designed to help secure and positionally retain media disks D within the removable stacked media magazine 620 when access to the media disks D is not presently desired and the two retention wings 230a, 230b and vertical separation comb bars 220a, 220b are in the closed position. However, when the system 1 software, in operational association with the controller (described hereinbelow), determines that a particular media disk D located within a specific removable stacked media magazine 620 is to be removed, or a new disk is to be inserted, the two retention wings 230a, 230b and vertical separation comb bars 220a, 220b are opened by way of a frontal pull pressure-type interaction during the disk manipulator mechanism's 20 approach toward the removable stacked media magazine 620 along an approach axis, as will be further described below. The frontal pressure-type opening is effectuated by specific interactive opening components located on an upper portion of each removable stacked media magazine 620 and on a portion of the disk manipulator mechanism 20. The two retention wings 230a, 230b and vertical separation comb bars 220a, 220b are then gradually closed during the departure of the disk manipulator mechanism 20 away from the removable stacked media magazine 620. These specific opening and closing operations will now be further explained by reference to the interaction components utilized during such operations.

The vertical separation comb bars 220a, 220b may be constructed for ensuring retention and stability of the media disks D by way of a plurality of machined perforations or the like in the form of a comb configuration design, a saw-tooth design, scalloped, or a rounded edge type design (each not shown).

Figure 10A:
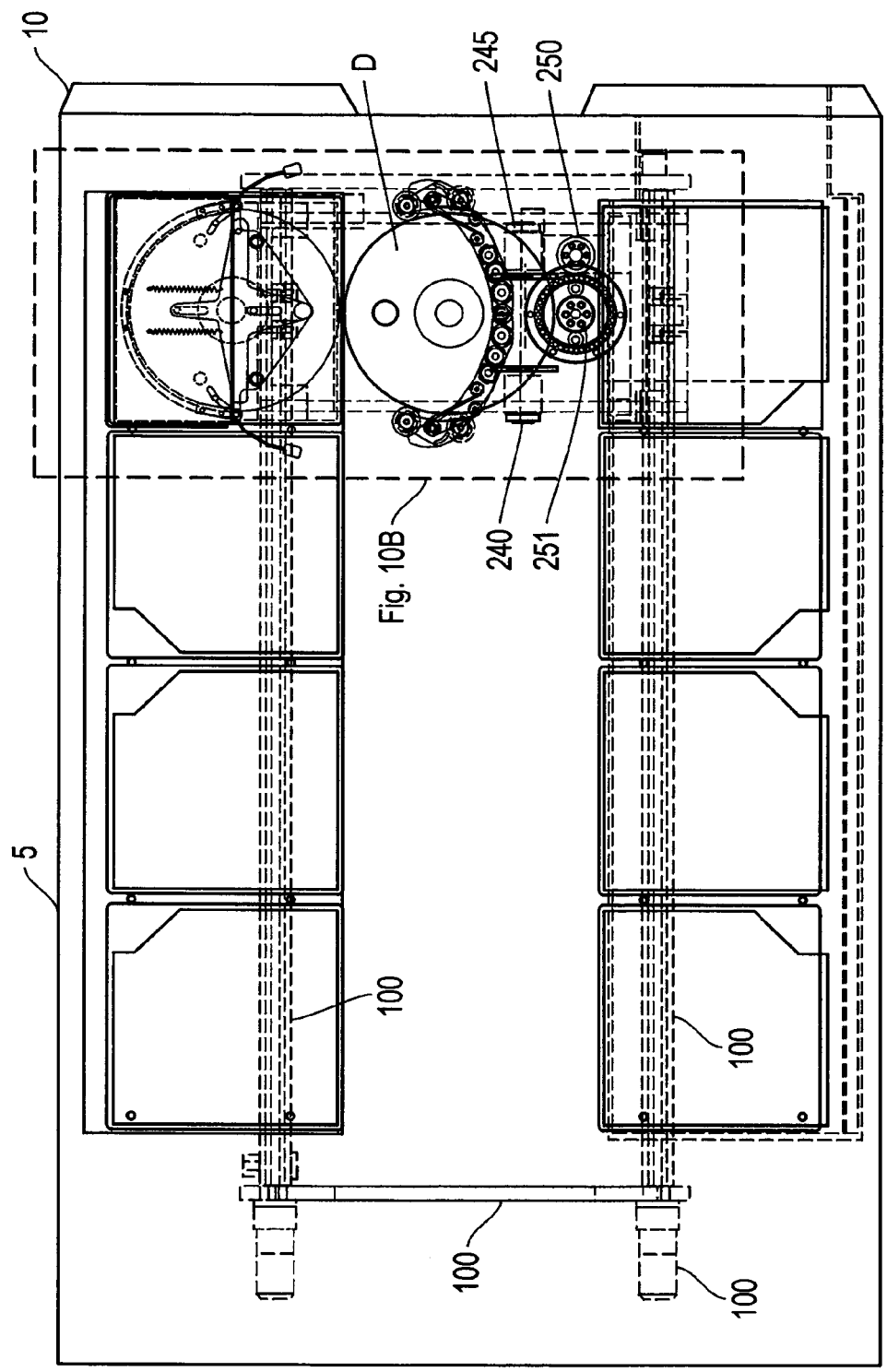
FIG. 10A is an internal top view of the system depicting placement of the plurality of removable stacked media magazines, a gantry device, and the disk manipulator mechanism according to the present invention.
Figure 11A:
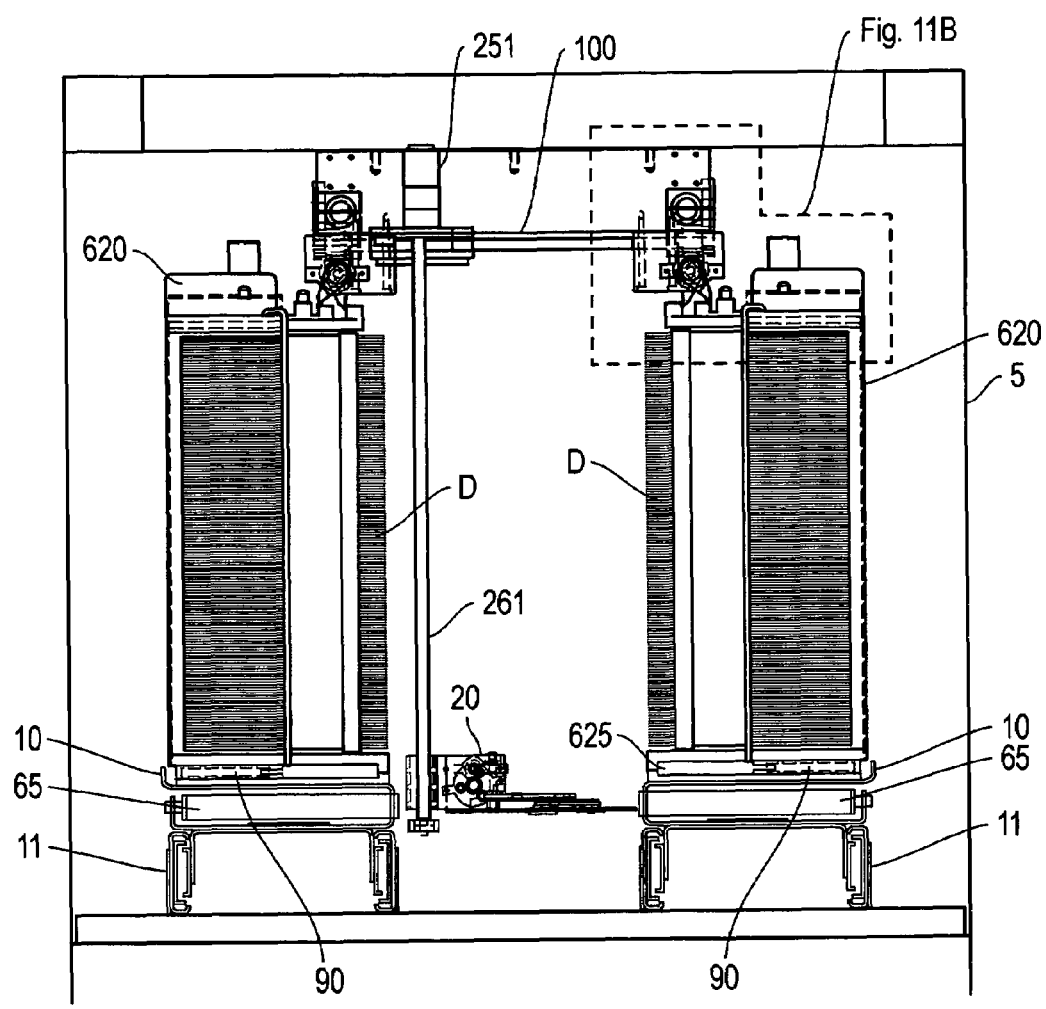
FIG. 11A is a partial front view of the interior of the system according to the present invention.
Figure 11B:
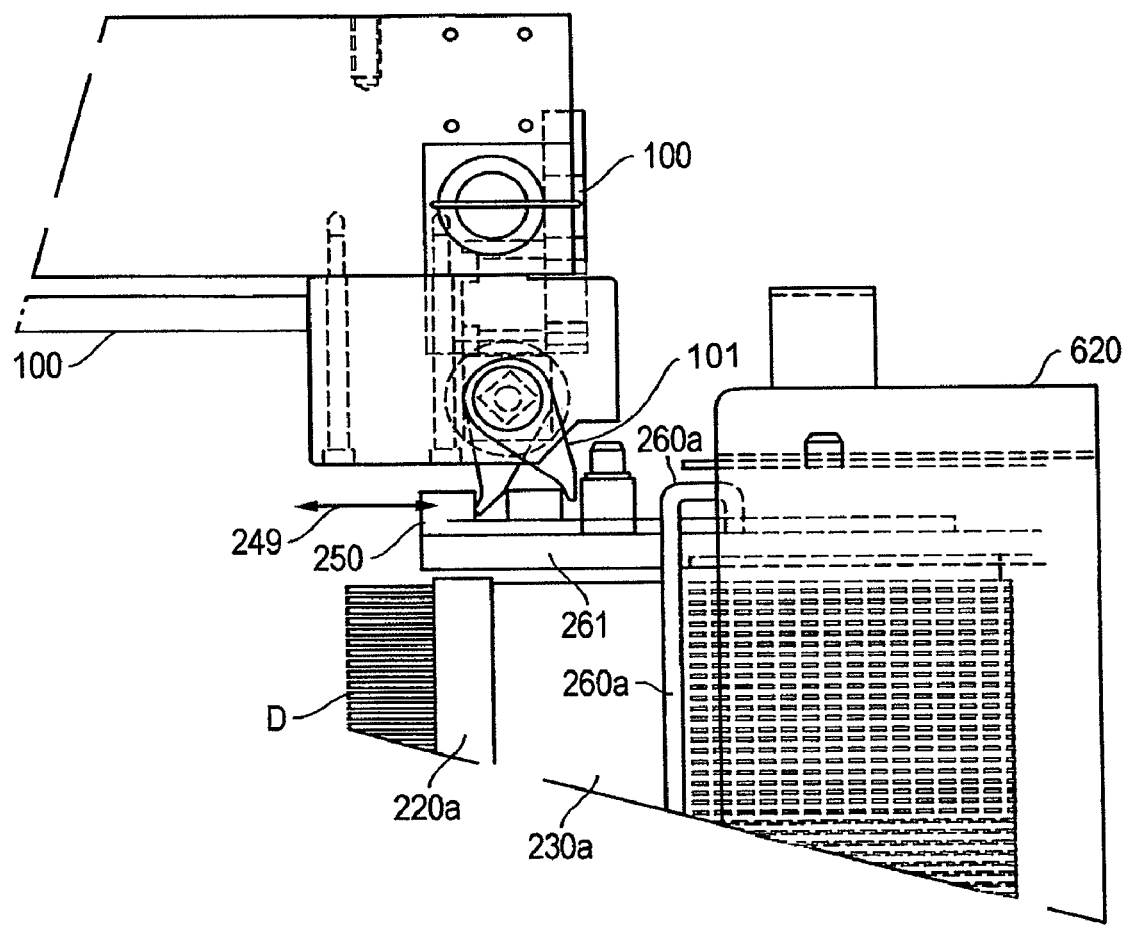
FIG. 11B is a partial side elevation of a portion of FIG. 11A depicting a portion of the gantry device's interoperation with a removable stacked media magazine according to the present invention.

FIGS. 2 and 3 and 11B show the interactive opening components, among other components, of the removable stacked media magazine 620. Specifically shown are a pull knob 250 integrally formed as part of a sliding unit mechanism 261 and activated by a pivotal finger unit 101 (shown in FIG. 11B) of a gantry device 100 (shown in FIGS. 10A, 11A, 11B), which when the sliding unit mechanism 261 is moved in relation to and in combination with alignment tabs 252a, 252b disposed on a stationary platform 240, and in the direction of arrow 249a along alignment tab channels 253a, 253b, causes the two retention wings 230a, 230b to pivot outwardly in an opening fashion due to the force exerted on hinging rods/bars 260a, 260b (by the sliding unit mechanism 261) which are attached to and extend in longitudinal length of each retention wing 230a, 230b, wherein the upper end of each hinging rod/bar 260a, 260b is bent over and inserted into respective top pivot channels 258a, 258b to effectuate simultaneous opening of each of the retention wings 230a, 230b as shown in FIG. 3 when pull knob is activated (shown by arrow 249 in FIG. 11B). Upon opening of the retention wings 230a, 230b, the vertical separation comb bars 220a, 220b retract from contact with the outer rim edge of the encompassing media disks D located and stored within respective removable stacked media magazine 620.

When the disk manipulator mechanism 20 is backed away from the removable stacked media magazine 620 by the gantry device 100 (shown in FIGS. 10A, 11A, 11B and described below) due to coded software instructions from the controller, the force exerted on the pull knob 250 (see FIG. 11B for further detail) by the pivotal finger unit 101 (shown in FIG. 11B) to cause the retention wings 230a, 230b to open is reduced and springs 257a, 257b cause the sliding unit mechanism 261 to slidably retract back (in the direction of arrow 249b) into a resting position. Such retraction, assisted by springs 257a and 257b, causes component interaction opposite as that described above in relation to the "opening" movement, which results in the vertical separation comb bars 220a, 220b to come back into media disk D engagement for effectuating media disk D separation.

Figure 4:
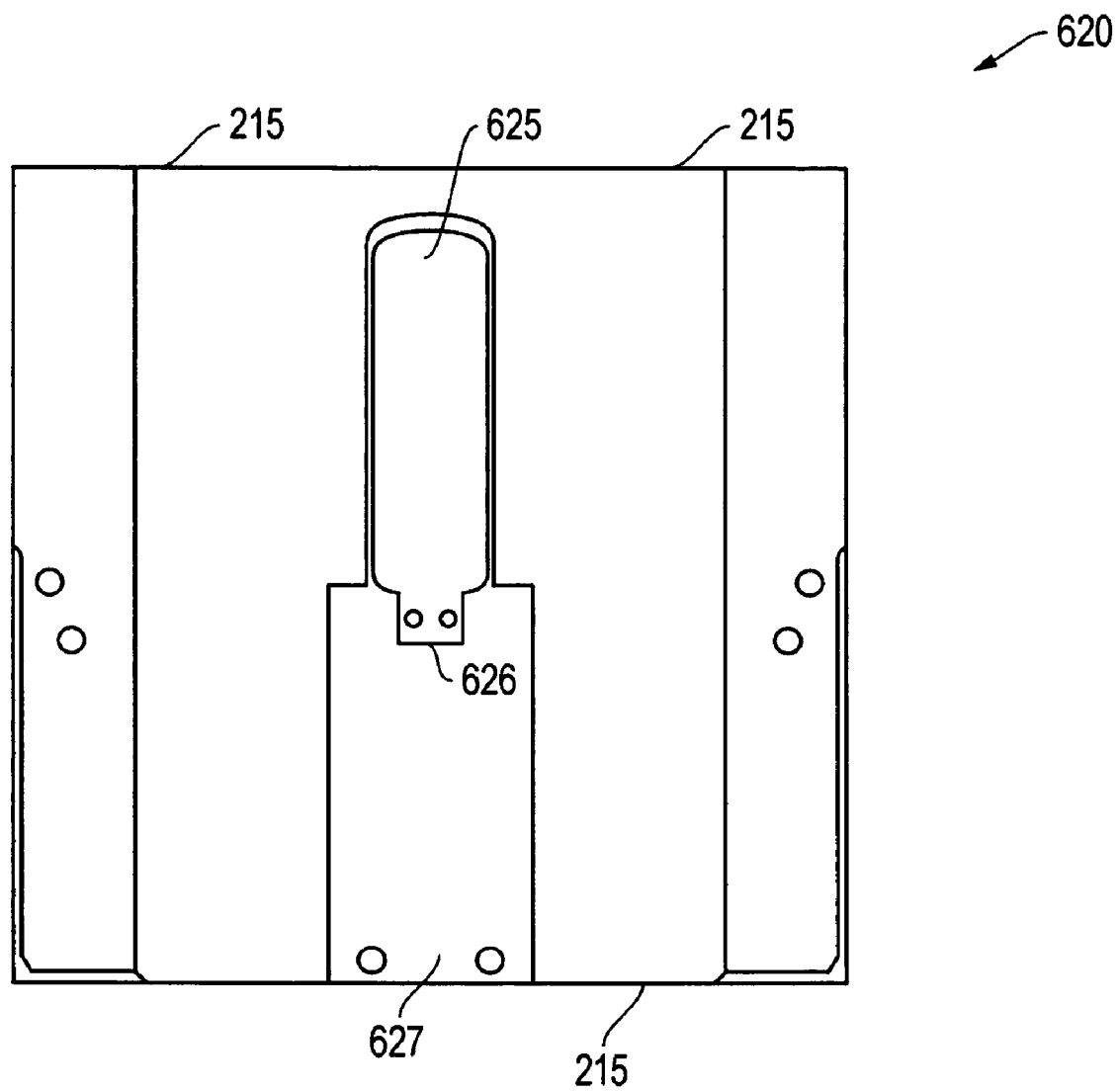
FIG. 4 is a bottom view of a removable stacked media magazine according to the present invention.

In further reference to FIGS. 2 and 4, each removable stacked media magazine 620 comprises a flash memory device 625 or small removable USB hard drive, with USB connection 626, wherein the flash memory device 625 is removably disposed in communication with the removable stacked media magazine 620 and the microprocessor (not shown). FIG. 4 shows a view of the flash memory 625 as it is removably installed on the removable stacked media magazine 620. The flash memory 625 is situated in a channel 627 created in the foundation 215 of the removable stacked media magazine 620.

The flash memory 625 used in one embodiment is that of the kind commercially available having memory size ranging from about 128 Mb to 2.0 GB or more. The removable stacked media magazine 620 is read and analyzed by an integrated computer storage mechanism and associated software of the system 1 when the removable stacked media magazine 620 is initially loaded onto one of the slidably removable disk magazine drawer mechanism's 10 of the system 1. The flash memory 625 or USB coupled hardware is used to keep file contents of each media disk D within its accompanying removable stacked media magazine 620. For example, if the removable stacked media magazine 620 contained a number files such as, but not limited to, stored video/image/data files and/or DVD movies, the flash memory 625 would contain a list of user desired information such as, but not limited to, cameras, time and date, locations, transaction data, or other meta-data or movie titles. The memory 625 can also store the first frame of stored video on the media disk D, or data, chapter and/or segment of information located on the media disk D so that the user can instantaneously search for a segment of such video or data using a smart search engine. The present system 1 further provides for the ability to begin playback of a media disk D while a separate media disk D is being indexed in one of the media player/burner 65 drive for recording or later playback.

The software provided by the system 1 of the present invention permits the microprocessor's operating system to view a high capacity media disk D or situations in the future when the removable stacked media magazine 620 may contain 500, 1000, or more disks therein. The system's software tracks the location and the contents of each media disk D stored within the system's 1 plurality of removable stacked media magazines 620. The individual flash memory 625 described above allows a single removable stacked media magazine 620 to be removed from the system 1 and the file contents of the single removable stacked media magazine 620 containing 100-125 disks to be removed with it. The contents of the flash memory 625 and the file structure of the removable stacked media magazine 620 is transferable to one or more of the plurality of hard drive storage units 70 in RAID array of the integrated system 1.

The flash memory 625 stores information automatically and is accomplished when the removable stacked media magazines 620 are positionally plugged into the system 1 upon installation of the respective removable stacked media magazine 620. In addition, as a removable stacked media magazine 620 is accessed by the microprocessor of the system 1, each media disk D in that removable stacked media magazine's 620 file structure stored in the flash memory 625 will be known and recognized by the microprocessor of the system 1. More specifically, the system computer will recognize specific storage information and will inform the user which miniature shelf 211 the disk D is located in the inner portion separation mechanism 210.

Similarly, video surveillance information from a specific date, camera, geographic location, file size or decimated single frame video images (i.e., "thumbnails"), is also recorded on the flash memory 625. It should be understood that the present invention can also be utilized to store and play video games, wherein the flash memory 625 effectively operates in the same manner to provide the user rapid program access and pertinent information relating to the specific media disk D storing the game.

An automated cycle counting inventory management application is provided that provides content verification against the storage file structure that was originally read off of the flash memory 625. Therefore, this provides for situations where a user loads a new removable stacked media magazine 620 with media disks D such that when the removable stacked media magazine 620 is indexed the media disks D may be catalogued for content on an ongoing basis. This function operates independent of whether the system 1 is in use or not. Furthermore, the cataloging and maintenance function is provided as an automated feature of the software. Furthermore, metadata information about each video file is stored in a metadata catalog that can be searched to find specific stored video and/or data and image files of interest.

Figure 6:
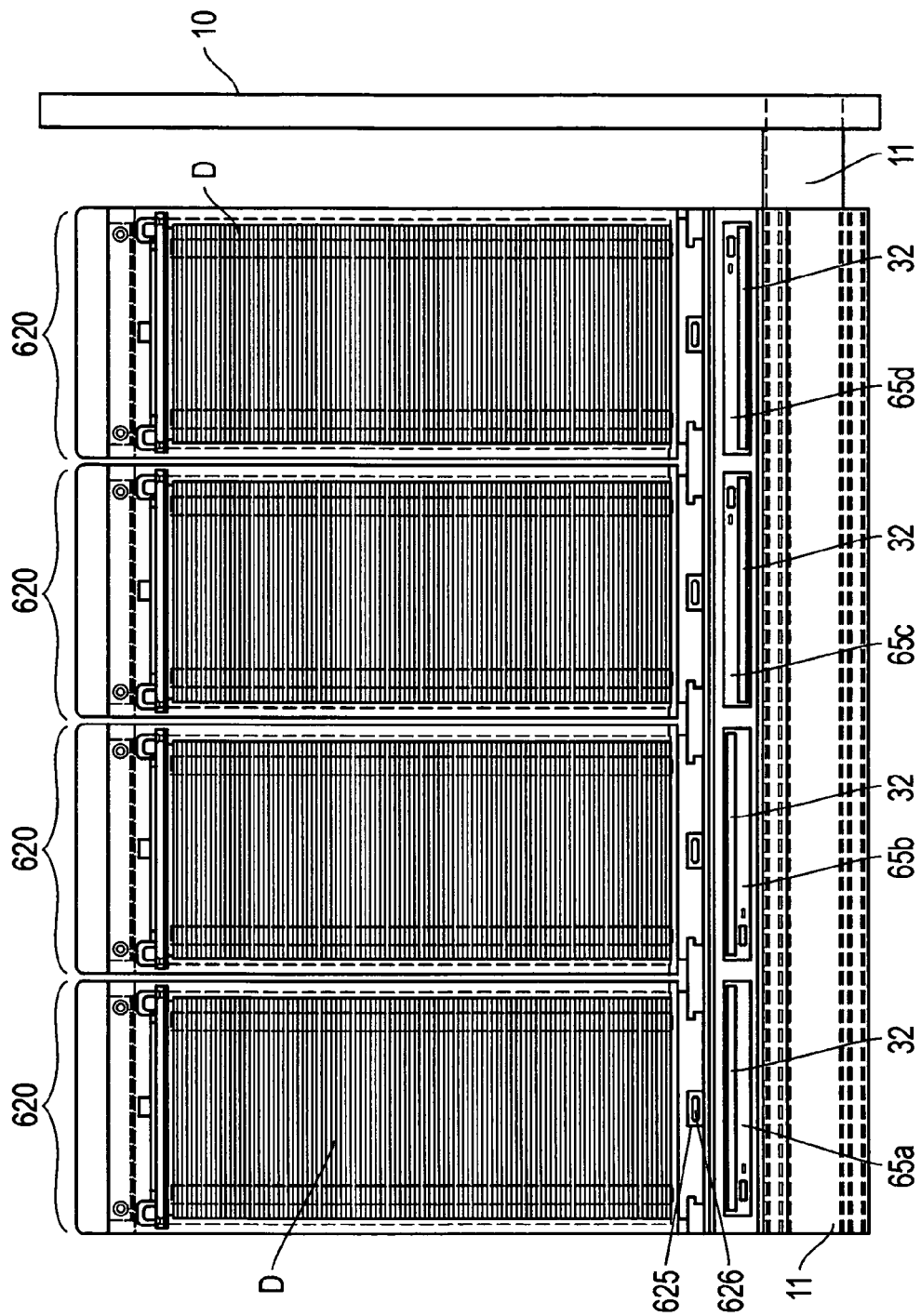
FIG. 6 is a side elevation view of one of the removable sliding drawers comprising a plurality of full removable stacked media magazines disposed therein with media player/burners disposed the drawer according to the present invention.

FIGS. 5 and 6 best show the positioning of the plurality of media player/recorders 65 utilized in one embodiment of the system 1. Each media player/recorder 65 comprises individual disk insertion/extraction ports 32 that permit for insertion and extraction of media disks D. The insertion/extraction ports 32 comprise an internal slot-in mechanism (not shown) that pulls the media disk D, when inserted by the disk manipulator mechanism 20, into the internal slot-in mechanism of the media player/burner unit 65. Likewise, the insertion/extraction ports 32 allow, upon ejection of the media disk D, extraction of the media disk D by way of the disk manipulator mechanism 20. Each media player/recorder 65 is connected to and controlled by a microprocessor and a controller via SATA, Firewire, EIDE, SCSI, USB or similar standard interface cables.

It can be seen with specific reference to FIG. 6, which depicts one of the plurality of disk magazine drawer mechanisms 10 (specifically shown is a right side disk magazine drawer mechanism 10), wherein a plurality of media player/burner units 65, now labeled in FIG. 6 as 65a, 65b, 65c, and 65d for explanatory purposes, are removably positioned thereon the disk magazine drawer mechanism 10. More specifically, each of the media player/burner units 65a, 65b, 65c, and 65d are operationally positioned in either a top-up or top-down configuration beneath its respective removable stacked media magazine 620. For example, in FIG. 6 media player/burner units 65a and 65b are mounted in a top-up configuration such that the insertion/extraction port 32 allows for insertion of a media disk D to record/play from a first side of the media disk D. Alternatively, and in addition to player/burner units 65a and 65b, player/burner units 65c and 65d are mounted in a top-down configuration such that the insertion/extraction port 32 allows for insertion of a media disk D to record/play from a second side of the media disk D. Such a top-up, top-down configuration permits the system's 1 components and devices to play and/or record on either or both sides of a media disk D that is inserted into the media player/burner unit 65. However, as described above, alternatively the player/burner units 65 may be positioned on one end of the housing body 5 in a stacked configuration.

In reference now to FIGS. 8, 9, 10A, 10B, 11A and 11B, the present invention provides for a software controlled gantry device 100 and disk manipulator mechanism 20 that are operationally, functionally and communicably connected for effectuating in combination indexing position translation, retrieval, grasping, placing/removing and translational transport of optical disks D from the individual disk insertion/extraction ports 32 of the media player/recorder units 65 and/or one of the removable stacked media magazine 620 in a plurality of axes for effectuating. The gantry device 100 and disk manipulator mechanism 20 components are constructed from a high grade plastic and/or aluminum for providing effective interface with the media disks D.

The disk manipulator mechanism 20 according to one embodiment of the present invention interfaces with a media disk D located in a removable stacked media magazine 620 or media player/recorder unit 65 and cooperatively interacts therewith the media disk D to retrieve/insert the media disk D from/into, respectively, the slot in or drawer of the media player/recorder unit 65 one of the removable stacked media magazines 620 or one of the media/recorder units 65. It will be understood that other magazine and player/recorder configurations are contemplated for use with the present invention such as, but not limited to, a toroidal shaped disk media storage carousel (not shown) or accordion styled carousel (not shown). Such alternative shaped storage carousel configurations can be utilized and removably mounted on a carousel transport platform (not shown).

The system 1 of the present invention comprises a plurality of various sensors 1007a and 1007b (shown in FIG. 8) located on or in association therewith the disk manipulator mechanism 20, the media player/burner unit 65 and/or the individual disk insertion/extraction ports 32 to permit the system 1 to intelligently recognize if a disk is present and in a position relative to each 20, 65, and/or 32. Additional sensors may be provided within the system 1 and are driven by control software provided by the present invention.

In one embodiment of the present invention, proximity sensors (not shown) are utilized with the disk manipulator mechanism 20 to determine and address positional and translational locations in reference to preprogrammed controller coordinates of specific media disk D and removable stacked media magazine 620 locations. However, one skilled in the art will recognize that other types of sensors used independently or in combination with the proximity sensors will also permit media disk D and removable stacked media magazine 620 location without departing from the scope of the present invention.

Another type of sensor that can be utilized by the present invention is of the type known as a photointerrupter, which in general is a sensor that incorporates an infrared LED and a photosensor within the same packaged unit. Such photointerrupters detect objects when the object interrupts a light beam emitted by an LED within the sensor. Infrared sensors work by sending out a beam of IR light, and then computing the distance to any nearby objects employing the characteristics of the returned signal. An example of the sensor used with one embodiment of the present invention is a Sharp GP2A200LCS light modulation, reflective type photointerrupter sensor that interfaces directly to the Galil controller and provides an input/output signal as to whether or not a media disk D is present.

In continued reference to FIGS. 8, 9, 10A, 10B, 11A and 11B, as previously mentioned, the system's 1 gantry device 100 and disk manipulator mechanism 20 are functionally operated via at least a plurality of preprogrammed software commands. Such software commands comprise a plurality of specific shelf 211 and removable stacked media magazine 620 address locations for providing translational movement and address commands that instruct the gantry device 100 and/or the disk manipulator mechanism 20, separately or in combination, and their associated components comprising a plurality of servos 240, 245, 250 (others not shown), a plurality of drive belts positioned in drive belt grooves (two primary drive belts 1004a, two secondary drive belts 1004b and two tertiary drive belts 1004c) located on both sides of the disk manipulator mechanism's 20 two-armed arcuate foundation 1016 and articulable driven wheels 1005a, 1005b, into proper positioning dependent upon the desired function such as insertion and/or retrieval.

Each instructional command and resultant device and component movement is dependant upon on where the disk D is desired to be placed or retrieved. The design disclosed by the present invention permits a media disk D to be removed from the removable stacked media magazine 620 without a pushing force being exerted from an opposite side. Such an advantage allows for less space to be required for operation of the many components and reduces the overall complexity of design.

The disk manipulator mechanism 20 of the present invention comprises a plurality of high traction articulable driven wheels 1005a, 1005b that are driven by servos 240, 245, 250 and/or stepper motors 251. The articulable driven wheels 1005a, 1005b are manufactured so as to have a top guiding chamfer and a high traction grooved gripping surface 1006, achieved by coefficient of friction combined with pressure. The wheels 1005a, 1005b may be made from a variety and combinations, as desired, of angular geometry metal, aluminum, rubber, grit blasting, or ceramic coatings. The articulable driven wheels 1005a also comprise a bottom guiding chamfer 996. As can be further seen in FIG. 9, driven wheels 1005b comprise a top guiding chamfer 997 and a lower reverse chamfer 998 which in combination capture and drive media disks D into the high traction grooved gripping surface 1006 located on driven wheels 1005b. A tapered throat of about 4 degrees is machined into driven wheels 1005b to capture the edge of the media disk D to provide for high contact pressure for adequate traction on the media disk D.

Figure 8:
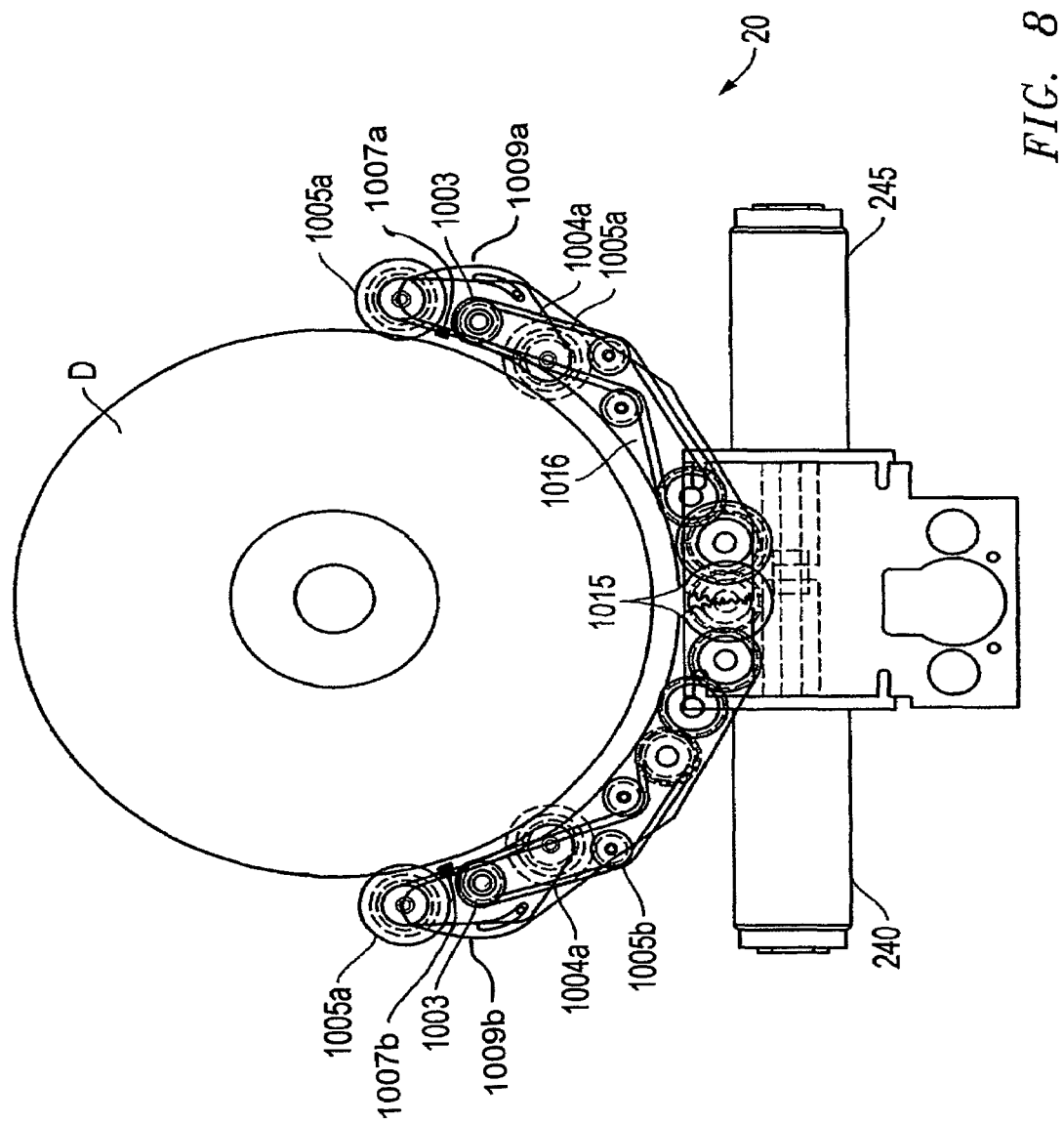
FIG. 8 is a top view of the disk manipulator mechanism depicting the mechanism having a media disk in grasp position according to one embodiment of the present invention.
Figure 9:
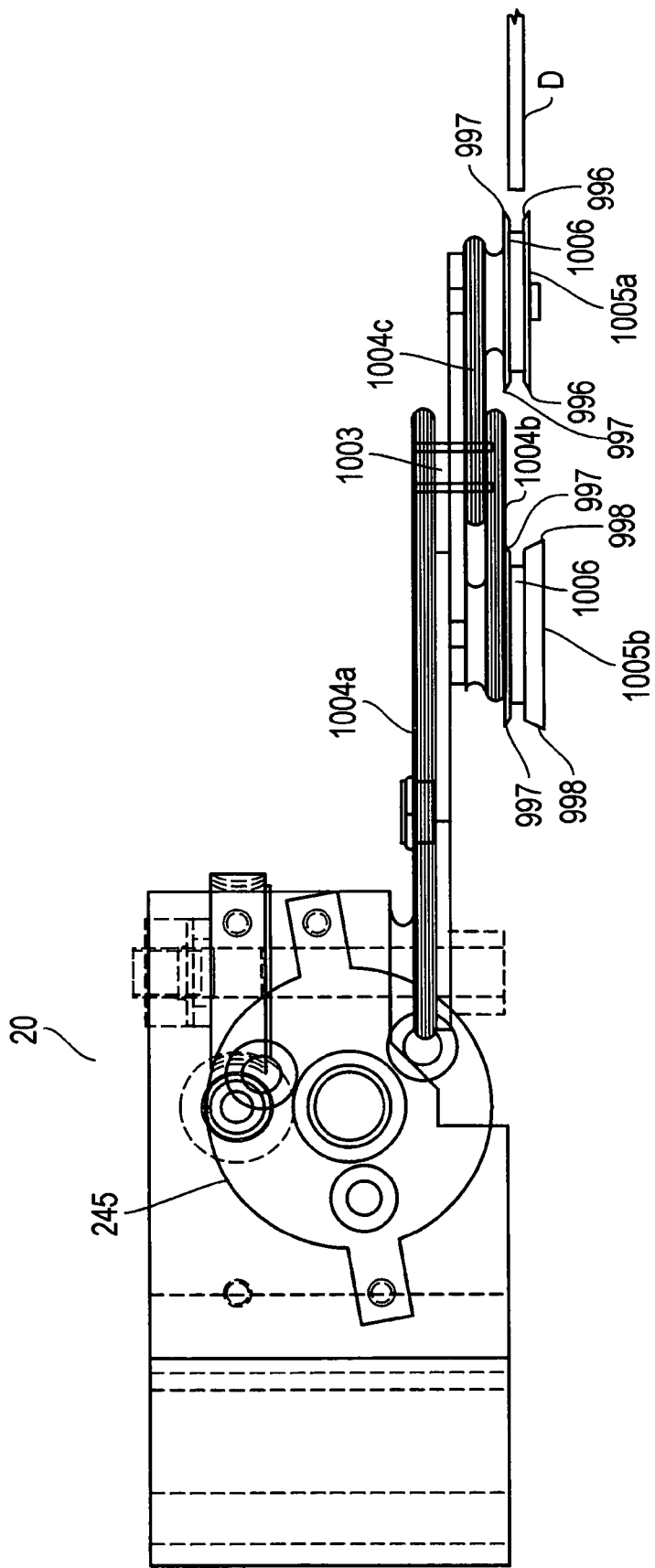
FIG. 9 is a side elevation view of the disk manipulator mechanism of FIG. 8 according to the present invention.

As best depicted in FIGS. 8 and 9, the driven wheels 1005a, 1005b are mounted on wrist sections 1009a and 1009b which are, in turn, connected to a two-armed arcuate foundation 1016, wherein the two-armed arcuate foundation 1016 articulates about a jawed articulable axis 1015 to allow for expansion of the two-armed arcuate foundation 1016 50 as to effectuate proper and adequate travel by the driven wheels 1005a, 1005b around the outer edge diameter of a media disk D, thereby permitting a jawed-type open and close movement. Connector pulleys 1003, made from Delrin® or other suitable materials, are positioned in each arm of the two-armed arcuate foundations 1016 to permit primary drive belts 1004a (or other mechanical drive means), driven by servo 240, which is operatively connected to a worm gear (not shown) that in turn drives a plurality of gears (each not shown) to simultaneously rotate, via the connector pulleys 1003, secondary drive belts 1004b and tertiary drive belts 1004c, which in turn cause driven wheels 1005a, 1005b to rotate either clockwise or counterclockwise (e.g., dependent upon which side of the two-armed arcuate foundation 1016 and whether a media disk D is being retrieved or inserted into a magazine 620 or media player/recorder unit 65). Specifically, the plurality of components operate to cause each side of the two-armed arcuate foundation's wheels, gears, belts and pulleys to operate in an opposite direction (i.e., clockwise or counterclockwise) depending upon the desired operation (i.e., media disk D extraction or insertion).

The disk manipulator mechanism 20 is transported up and down in a vertical "Z" axis via a vertical ball screw 261, as best seen in FIG. 11A, wherein the vertical ball screw 261 is functionally and operationally connected to both the gantry device 100 and the disk manipulator mechanism 20. The vertical ball screw 261 is rotationally activated by a servo 250, stepper motor 251 and gear combination, which in combination are controlled by a plurality of software communication commands from the controller software resident in the Galil controller, or similar controller. The disk manipulator mechanism 20 can be rotated 180 degrees in either direction by the vertical ball screw 261 and servo 250 combination without the elevational (i.e., up or down) position of the disk manipulator mechanism 20 being changed.

In reference specifically to FIG. 9, when the software or user selects via the optical mouse 50, the IR keyboard 45, and/or an exteriorally-installed LCD touch screen device 35, selects a desired media disk D for retrieval from the removable stacked disk magazine 620, the combination gantry device 100 and the disk manipulator mechanism 20 moves into a substantially adjacent position with the media disk D to permit a plurality of high traction grooved gripping surfaces 1006 of the plurality of the driven wheels 1005a, 1005b to come into frictional gripping contact with the desired predetermined media disk D.

Figure 10B:
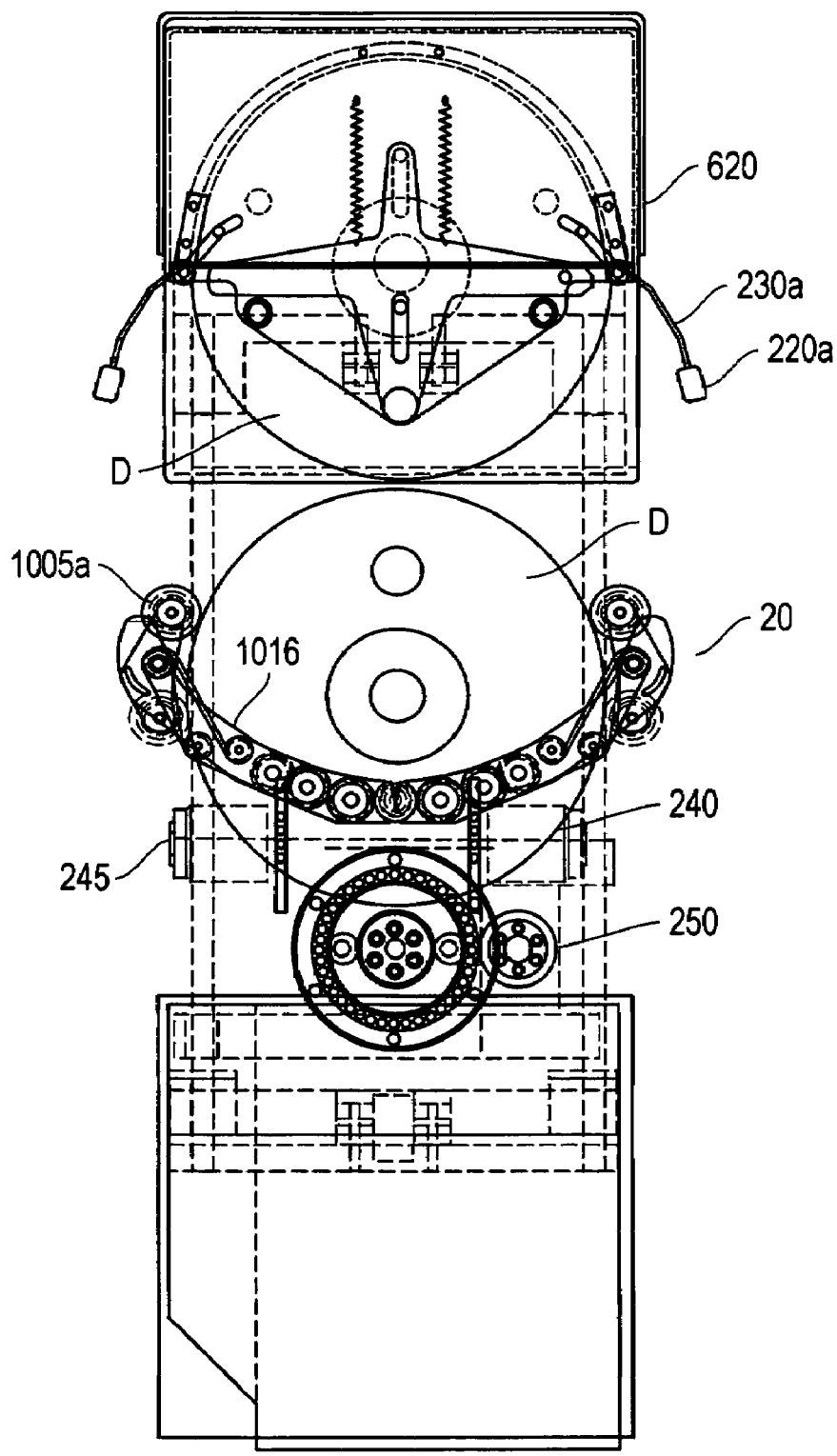
FIG. 10B is a top view of a portion of FIG. 10A depicting the disk manipulator mechanism operationally positioned between two removable stacked media magazines according to the present invention.

As can been seen in FIG. 10B, when the driven wheels 1005a, 1005b come into contact with the edges of the outer edge diameter of the desired media disk D, the jawed articulable axis 1015 permits an opening expansion of the arcuate foundation 1016, thereby allowing the driven wheels 1005a, 1005b to continue travel until each driven wheels 1005a, 1005b is in an approximate relative opposing interim position along the outer edge diameter of the media disk D. During this portion, driven wheel devices 1005a will rotate counterclockwise and driven wheel devices 1005b will rotate clockwise. The driven wheel devices 1005a, 1005b will each continue such rotation until they are past a centerpoint of the opposing interim position and are in a transport position as is generally depicted by the media disk D position within the disk manipulator mechanism 20 shown in FIG. 10B. It is at this point that the driven wheel devices 1005a, 1005b rotation is stopped by system software and the disk D is transported for placement into an individual disk insertion/extraction port 32 of one of the media player/burner unit 65 or into a different removable stacked disk magazine 620 installed on one of the drawers 10 in the main body 5.

The above process is reversed when the software and/or user has finished the desired task (playing and/or recording) with the media disk D. More specifically, the disk manipulator mechanism 20 removes the disk D from an individual disk insertion/extraction port 32 of one of the media player/burner unit 65 or from a removable stacked disk magazine 620 installed on one of the drawers 10 in the main body 5. Driven wheel devices 1005a will be instructed by the system software to rotate clockwise and driven wheel device 1005b will be instructed to rotate counterclockwise to hold the disk D in a position similar to the opposing interim position, described above, to facilitate retrieval of the media disk D. Upon possession of the media disk D by the disk manipulator mechanism 20, the gantry device 100 driven by controlling software and associated components then translationally transports the disk manipulator mechanism 20 left, right, up and/or down into a desired addressed and indexed position relative to the media disk's D previous position in the removable stacked disk magazine 620 or to an alternate vacant shelf 211 slot in the removable stacked disk magazine 620.

As mentioned above, the present invention also allows the user to insert individual media disks D into the at least one front facing exteriorly installed media player/recorder 66 (as shown in FIG. 1) for manually inserting and extracting individual media disks D for playing, copying and or recording purposes separate and apart from the players/recorders 65. Upon completion of the desired process (recording and/or playback) the user and/or software, via system interfaces, commands the system 1 to cause the media player/recorder unit 66 to eject the disk D to allow removal by the user. The front facing exteriorially installed media player/recorder 66 can be front facing or side facing.

As previously mentioned, the present invention utilizes a dedicated servo control system manufactured by Galil, or other comparable similar device, and its dedicated programming language to code objects within the system 1 for operation. The code utilized is for reading a plurality of sensors (each not shown) and for driving the plurality of servos 240, 245, 250 (others not shown), that interoperate and intercommunicate with the gantry device 100 and the disk manipulator mechanism 20.

More specifically, and by way of example, the plurality of sensors are sensors that are utilized to read properties of the sensor to inform the system 1 that a media disk D is in a media player/recorder unit 65 or to inform the system 1 of the location of the media disk D on the disk manipulator mechanism 20. By further example, the plurality of sensors allow the system to detect if there is a disk D in a particular indexed position within the removable stacked media magazine 620 prior to retrieving the media disk D or inserting another media disk D. The code allows query of the sensor to determine whether or not a particular sensor is detecting something at its position.

Similarly, the code in the main system processor communicates with the dedicated Galil, or the like, servo controller to determine its relative position in a particular axis and to specify the speed and amount and degree of servo rotation needed to carry out a specific task. The servos control at least, but not limited to, the gantry device 100, the disk manipulator mechanism 20, the ball screw 261 and the driven wheels 1005a, 1005b.

The plurality of servos 240, 245, 250 (others not shown) in communication with the gantry device 100 and the disk manipulator mechanism 20 utilize servo mechanical position information programmed into servo controller software to determine, instruct and address proper disk D pick-up and drop-off positions. For example, a disk drop-off position address may be for a specific individual disk insertion/extraction port 32 of a specific player/burner unit 65 and a pick-up position may be from one of the miniature shelves 211 located on the inner portion separation mechanism 210 of one of the removable stacked media magazines 620.

The disk manipulator mechanism 20 of the present invention provides ideal functionality to solve applications which require fast, repeatable and articulate point to point movements to remove items such as media disks D. Because of its unique "X, Y, Z and θ" axis translation motions, the combination of the gantry device 100 and the disk manipulator mechanism 20 are ideal for use with the present invention in that constant acceleration through motions for dispensing the media disk D into a desired position is desired.

Figure 12:
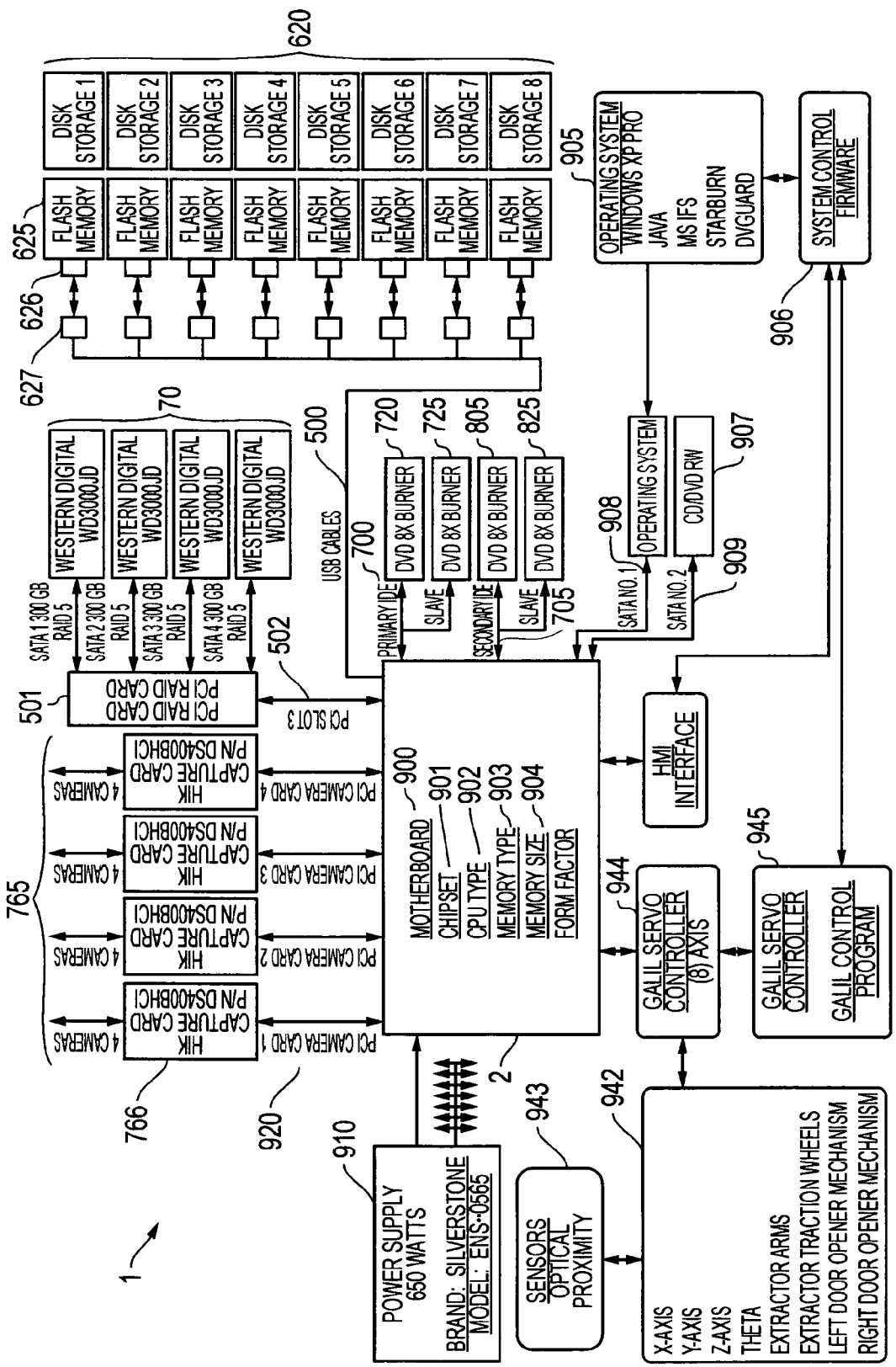
FIG. 12 is a system component schematic overview according to the present invention.

Now referring to FIG. 12 wherein a system 1 component schematic overview of the present invention is depicted. FIG. 12 illustrates the plurality of various components and devices that make up one embodiment of the present invention. For descriptive clarity purposes, the components and devices shown in FIG. 12 may possess specific reference numerals unlike those utilized throughout the previous detailed description. The specific quantity of any component or device shown in FIG. 12 is not meant to limit the scope of the present invention. The inventors of the present invention contemplate any combination and number of such components and devices.

As shown in FIG. 12, provided is a computer system 2 comprising an operating system 905 and at least one CD/DVD RW drive 907 each connected via separate single cables 908, 909, thereby creating a point-to-point connection; system control firmware 906; a motherboard 900 such as, but not limited to, an MSI K8N NE04 PLATINUM; a chipset 901 such as, but not limited to, an NVIDIA nForce 4; a CPU 902 such as, but not limited to, an AMD ATHALON 64×2 3800+; a memory type 903 such as, but not limited to, a KINGSTON KVR40064C3AK2; and a memory size 904 of at least 1024 Mb, preferably 2 GB. The computer system 2 is supplied at least 650 watts of power via connection to a power supply 910 such as a Silverstone ENS-0565. The computer system 2 further comprises a plurality of inputs for accommodating a plurality of components such as, but not limited to the following list of components: a plurality of DVD/CD players/burners 720, 725, 805, 825 each connected to the computer system 2 via at least two IDE interfaces 700, 705.

Further shown and provided are a plurality of removable stacked media magazines 620 (disk storage 1-8) each having at least one flash memory device 625 ultimately connected to the computer system 2 by way of USB cabling 500 that is connected to integrally disposed USB interfaces 627 found on each removable stacked disk magazine 620 position on each drawer 10 which in turn plug into each flash memory device 625 when the magazine 620 is installed on the drawer 10. The system 1 allows multiple media disks D to be digitally burned in succession automatically and watermarked so that the video image on the disk D can then be admissible in court. This process is achieved by burning the image directly onto the disk D using computer interfaces, capturing the image, and then transferring it directly to permanent media disk D storage within the system 1. The present invention allows storage of data from about one month to over a year on a full quantity of media disks D store inside the system 1 as described above. The disk D quantity can range from about 400 to 1,000 (or more) disks, which is further dependent upon the number of removable stacked media magazines 620 stored inside the system 1.

In further reference to FIG. 12, a plurality of hard drive storage units 70 are arranged in a RAID array are connected to a PCI slot 502 on the computer system 2 via at least one PCI RAID card 501 for effectively providing up to several terabytes of buffer storage.

In addition, a plurality of surveillance cameras 765 are provided and connected to the computer system 2 of the present invention via camera interface cards 920 and a plurality of capture cards 766. Such cameras 765 can provide at least 640×480 resolution at 30 frames per second (fps) twenty four (24) hours per day, seven (7) days per week. The system 1 provides software for controlling the camera interface cards 920 to identify connected surveillance cameras 765 and other devices, such as cash registers 905, doors, movement sensors, to allow recorded media storage to be digitally compressed by system hardware. Software is utilized to control the capture of images off of each camera 765 based upon predetermined specified alarms, motion, or scheduled surveillance activities. The captured data is then digitally compressed (e.g., by a factor of 5 to 10 times or more) by system hardware and transferred over a network 760 to the system 1 for storage. The present invention provides the capability for 16 to 64 (or more) cameras to have digital signal processing (DSP) video compression applied thereto.

Further provided and shown in block 942 is a plurality of available axes (X, Y, Z and θ) made available by the combination of the gantry device 100 and the disk manipulator mechanism 20 of the present invention. In addition, it is shown in block 943 that those items listed in block 942 are impacted and associated by a variety of sensors. In addition, the gantry device 100 and the disk manipulator mechanism 20 are each in communication and are controlled via a servo controller 944 having resident control program software 945 programmably installed.

Figure 13:
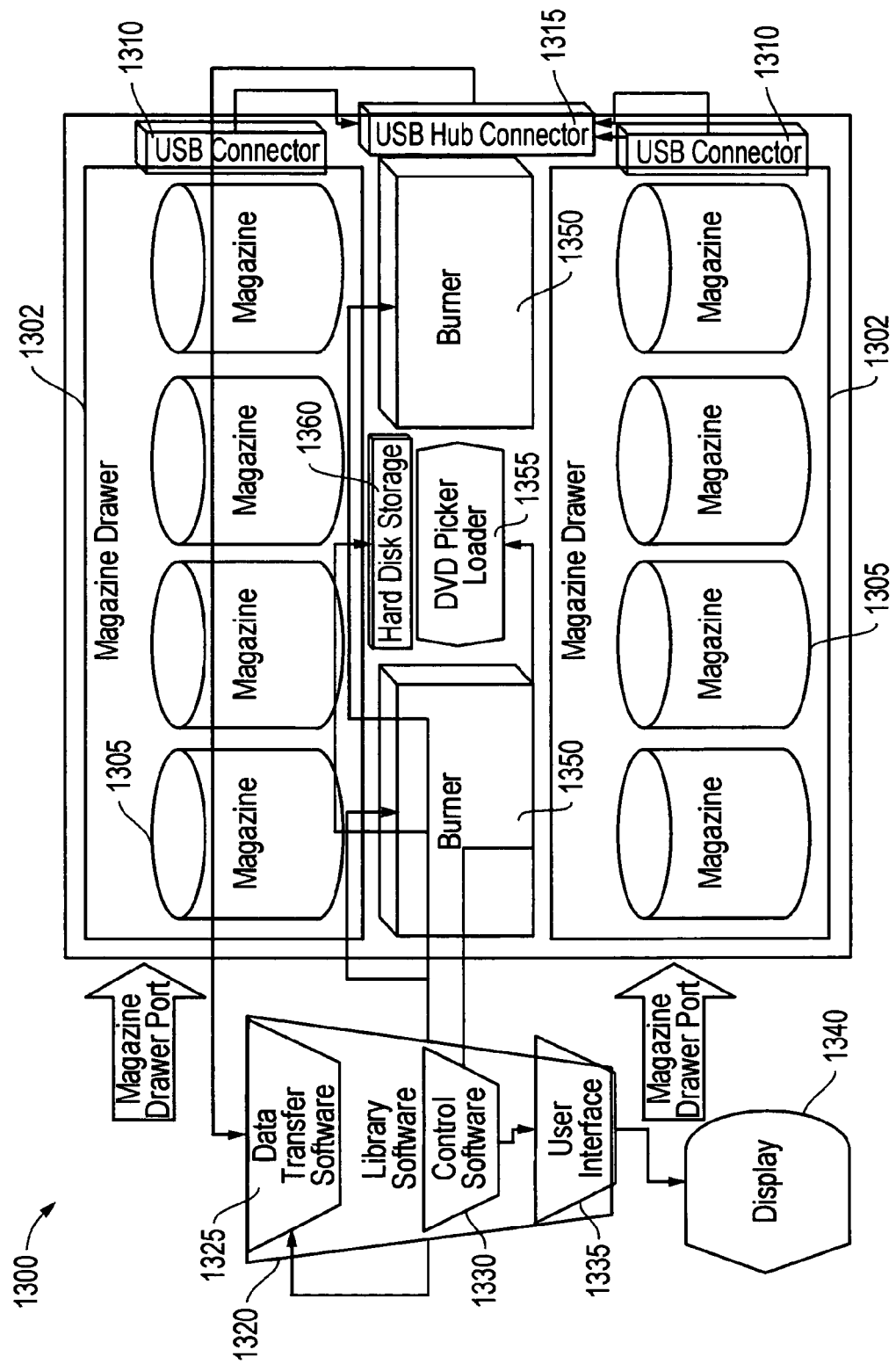
FIG. 13 is a system block diagram depicting the software relationship with various components according to the present invention.

With reference now to FIG. 13 a system block diagram according to the present invention will be described. The software approach of the present invention provides a component architecture that defines and provides components to monitor data, archive data, catalog media disk/metadata, burn DVDs, and manage the overall system's capabilities. The framework controls component startup, configuration, execution and management. Various components can be extended to add new behavior, modify existing behavior or replace existing behavior. More specifically, components implement pre-defined interfaces to extend, modify or replace these behaviors. The system provides for data monitor, archive and metadata catalog components that are customizable for each type of application data being processed such as, but not limited to, different file/directory structures or database definitions, hardware data capture and different metadata query requirements. In addition, the present invention's software provides for a Windows® installable file system component for intercepting operating system and application directory and file open, read and close calls. It will be understood by one skilled in the art that other standard operating systems such as, but not limited to, UNIX, LINUX, or other similar operating systems may be used without departing from the scope and spirit of the present convention.

The software architecture of the present invention permits deployment in at least two ways such as, but not limited thereto, monolithic and client/server. The monolithic deployment comprises at least one program containing all components running on a single system that uses direct Java® (or other software) calls between components. The client side of the client/server deployment comprises at least a data monitor and a client archive component. The server side of the client/server deployment comprises at least a disc/metadata catalog, burn, storage management and server archive components. Overall the communication is between archive components via Java® sockets. As mentioned above, the system provides a graphical user interface (GUI) that is also controlled by the invention's software, wherein the GUI is utilized to configure, monitor and manage components in addition to the overall system itself. In addition, customized components supply configuration and monitoring GUI displays.

The software framework of the present invention provides comprehensive component control, configuration and monitoring functions. For example, the GUI provides for configuration of the storage unit, for monitoring, archiving, cataloging, and burning parameters, communication parameters in a networked version, player/recorder configurations and implementation classes for all system components. The system offers function via system controlled components and software to any application that creates data as its output such as, but not limited to, video surveillance, imaging (e.g., medical and dental) and application data archiving.

As can be seen in FIG. 13, the system block diagram 1300 shows the software relationship as pertaining to various system components. Specifically shown is the connection of a plurality of disk magazine drawers 1302 comprising a plurality of disk magazines 1305 wherein each magazine 1305 comprises a plurality of media disks wherein each of these components allow data transfer to/from a library software 1320 via a USB hub connection 1315 via drawer USB connectors 1310. The data flow from each magazine's 1305 contents is controlled and provided configuration functionality through the library software 1320 stored onboard the system's computer. The library software 1320 comprises, but is not limited to data transfer software 1325 and control software 1330. The control software 1330 provides specific operational functionality to the disk manipulator mechanism (listed in the Figure as DVD Picker Loader 1355). The library software 1320 provides specific operational functionality to at least a user display 1340 via a user interface 1335, a plurality of player/recorders (e.g., burners 1350) and at least one, but not limited to, hard disk storage device 1360.

Figure 14:
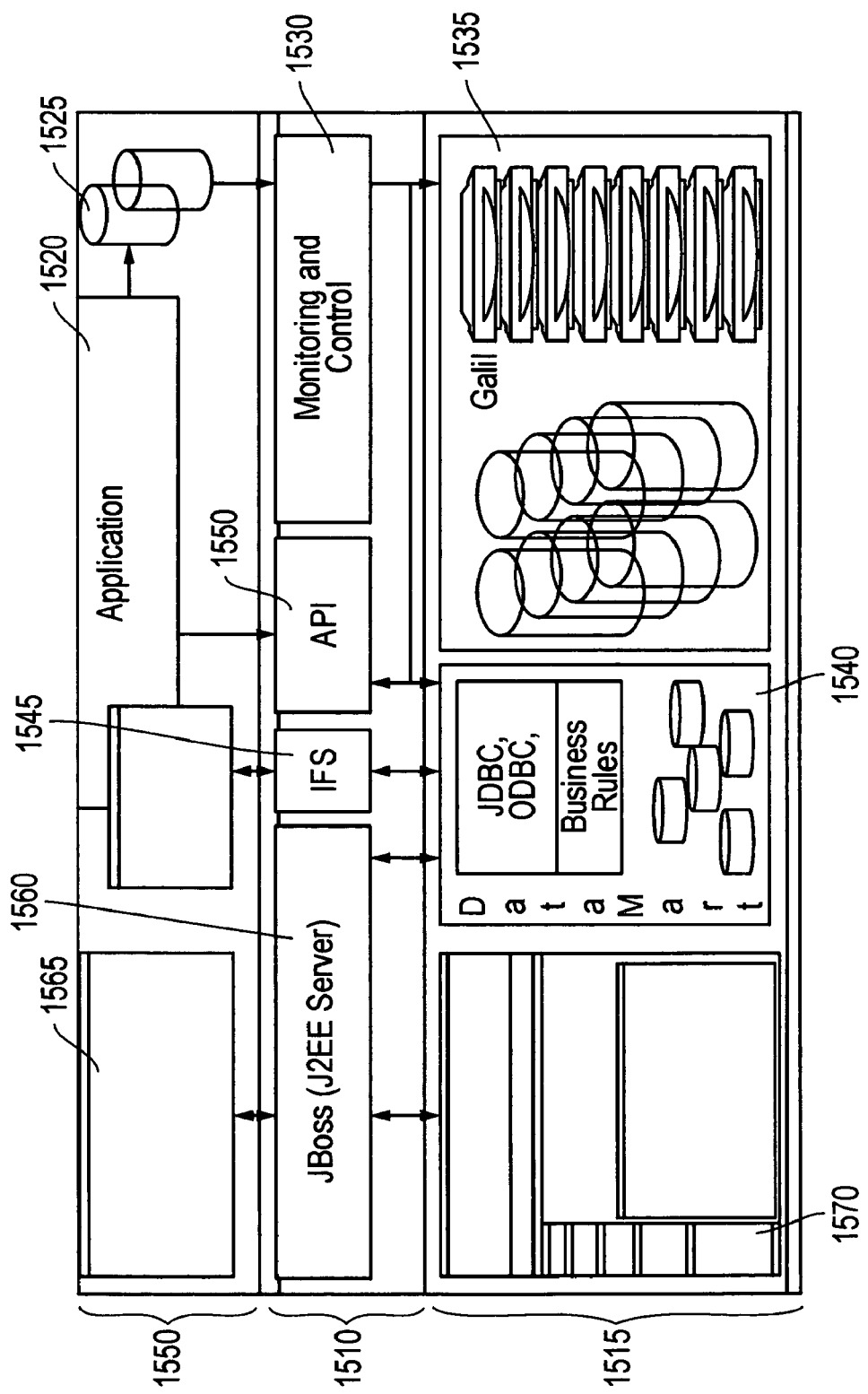
FIG. 14 is a diagram depicting system component software interfacing and relationship according to the present invention.

In reference now to FIG. 14 a diagram is shown that depicts system component/software interfacing and relationship according to the present invention. FIG. 14 depicts the present invention as comprising an application/user layer 1505, a communications layer 1510 and an infrastructure and control layer 1515. Specifically, FIG. 14 shows an application/user layer (e.g., a software application of the present invention) wherein a specific application 1520 that is utilized provides for writing/recording/burning files to a hard drive 1525 and/or other suitable storage devices while resident system software monitors the files being archived/saved.

The communications layer 1510 comprises programmed monitor and control software 1530 for facilitating monitor and control functionalities of and to a servo controller 1535 (e.g., a Galil controller) in the infrastructure and control layer 1515 for interaction with a servo controlled device and a plurality of media magazines and disk player/recorders comprising a plurality of media disks that serve as the system's primary storage mechanism as described above.

Also a part of the infrastructure and control layer is a datamart 1540 for facilitating the storage of processing and historical data and statuses and is in communication with an information file service (IFS) 1545 and an application programming interface (API) 1550 for end user interfaces. The IFS provides for a standard Windows open dialog interface. The datamart 1540 comprises Java Database Connectivity (JDBC) technology which is an API that provides access to a wide range of databases and access to tabular data sources, such as spreadsheets or flat files. In addition, the datamart 1540 provides Open Database Connectivity (ODBC). The goal of ODBC is to make it possible to access any data from any application, regardless of which database management system (DBMS) is handling the data.

Furthermore, the datamart 1540 is also in communication with a JBoss (J2EE Server) 1560 for providing network and intranet interfacing. The JBoss 1560 design of the present invention provides for a web search interface 1565 and a configuration and status interface 1570. Also provided in the datamart 1540 are the business rules which set conventions for entering data into the databases that are specific to the system's methods of conducting desired operations.

Figure 15:
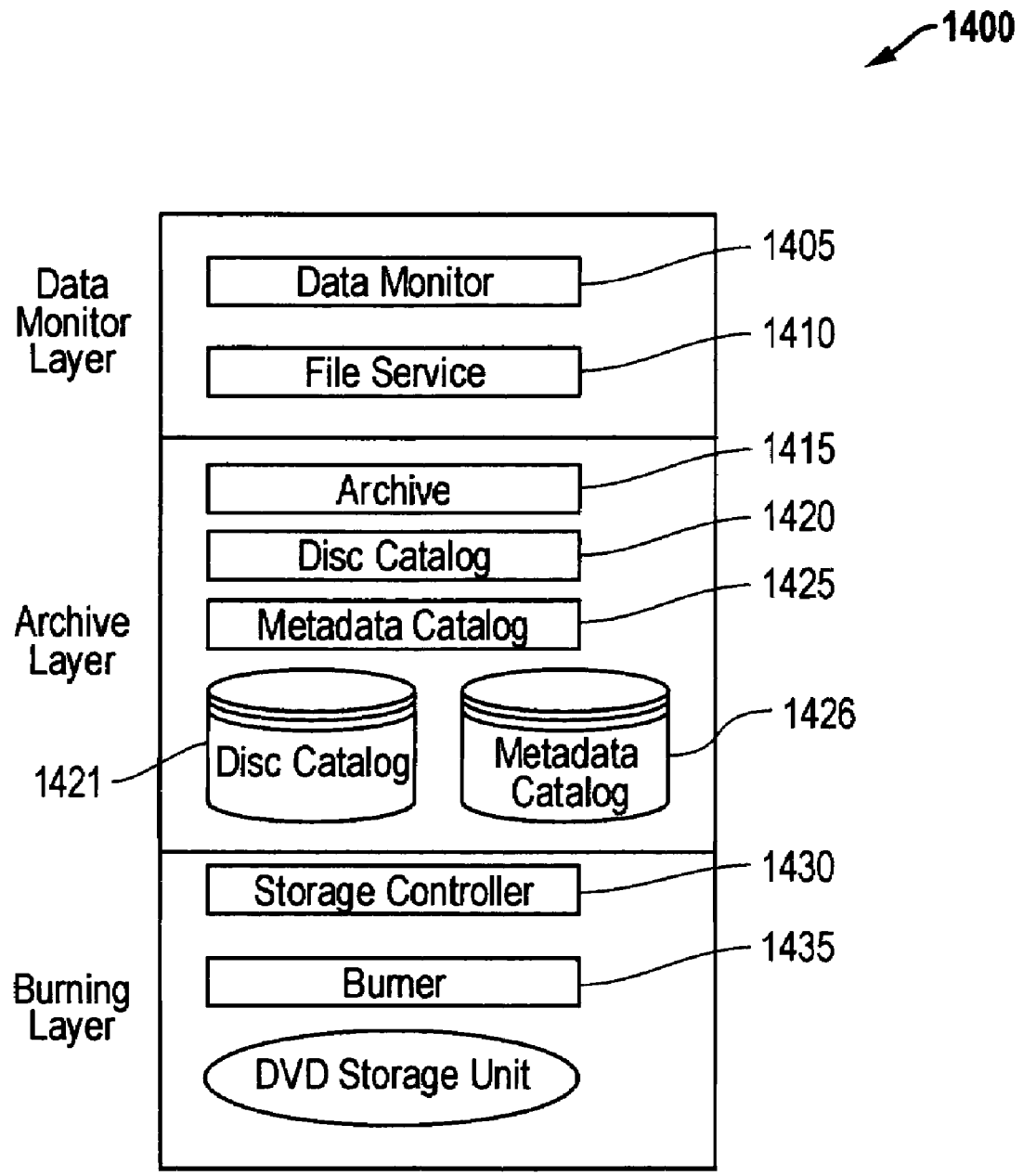
FIG. 15 is a diagram depicting the software component extensions according to the present invention.

In reference now to FIG. 15 software component extensions 1400 of the present invention's storage unit are depicted. Specifically, a data monitor component 1405 is provided for efficiently and actively monitoring data in specified location and in specific formats such as, but not limited to, files/database and video/image/data. The data monitor 1405 has separate threads (e.g., a thread monitoring directory for group one such as camera 1; and a thread monitoring directory for group two such as camera 2 and camera 3).

The data monitor component 1405 determines when an adequate amount of data exists in a temporary storage to permit archiving functions to a DVD or CD (i.e., is there enough data to fill an entire DVD, a single DVD side or just a DVD layer). The data monitor 1405 further creates collections of items that require archival and also determines when data meets specific criteria for being marked "not-online" (i.e., data has been removed or cleared from a hard drive unit).

The invention's file service component 1410 for an application file open procedure intercepts all application directory/file open requests. The file service component 1410 also checks a disc catalog component 1420 (described below) to see if files are online. If a file was online, application file open is completed and the opened file is returned to the application. However, if the file was not online, the file service component 1410 requests an archive component 1415 (described below) to bring the file back online. If the file is offline, the archive component 1415 uses the disc catalog component 1420 to locate the disc where the desired file is located.

Also provided, and shown in FIG. 15, by the present invention is an archive component 1415 that uses a disc catalog component 1420 to locate blank DVDs or CDs, for example, within the system's library. The archive component 1415 copies data from the client if running as client/server but directly accesses data if running as a single system as described above. The archive component 1415 also functions to flag and initiate the recording/archiving (i.e., burn) of collected data and catalogs the burned data information to a disc catalog 1421 via the disc catalog component 1420. Each thread submits an archive request to archive its collection of files. Flagged files are created to indicate files that have been archived. The archive component 1415 further catalogs metadata information to a metadata catalog 1426 via a metadata catalog component 1425.

The archive component 1415 shown in FIG. 15 runs on the server side in network deployed environments. A client side archive component operates as a thin proxy for communicating with a server archive component. In addition, the archive component 1415 processes requests from the file service 1410 to bring "not-online" files back online (e.g., copy from DVD back to a hard drive, load a DVD and read directly from a drive, and request operator remount of offline storage magazines.

FIG. 15 further discloses the disc catalog component 1420 of the present invention. The disc catalog component 1420 provides mechanisms for storing and retrieving disc information from persistent storage and also manages metadata about the storage magazine and the files on each disc within each magazine. The disc catalog component 1420 is separate from an application metadata component 1425 (described below) to prevent effects to the basic system operation.

The metadata catalog component 1425 provides mechanisms for storing and retrieving metadata from persistent storage. The metadata catalog component 1425 queries various mechanisms on an as-needed basis to satisfy a specific application's needs. The metadata catalog component 1425 further manages all metadata associated with application data to provide mechanisms for storing and retrieving application defined metadata. Specific applications function independently to determine the definition of and interpretation of metadata. The metadata catalog component 1425 stores metadata about video files into an application database table to permit quick retrieval of the location of "tagged" events. In addition, the metadata catalog component 1425 provides query mechanisms and requests to enable location of metadata instances and video files that meet search criteria.

FIG. 15 further depicts a storage controller component 1430. The storage controller component 1430 controls access to and operation of the storage mechanism of the system. The storage controller component's 1430 operations are performed in their entirety (e.g., move disc from a magazine to a burner, move disc from a burner to a magazine). In addition, all requests received by the storage controller component 1430 are queued and process as they arrive but the mechanism can also implement a priority scheme if needed.

In further reference to FIG. 15, the software of the present invention further provides for a player/recorder ("burner") component 1435. The burner component 1435 controls the access to player/recorders and provides the capability to configure a plurality of simultaneous burns. This capability allows for the reservation of at least one player/recorder to act as a data retrieval device for the operation. The software allows for configuration of player/recorders as a read-only or read-write only configuration with specific read/write priorities. The burner component 1435 allocates record function across all read-write devices to distribute usage. In addition, the burner component 1435 comprises a configure priority reservation scheme that ensures that drives are available for reading offline files. The burner component 1435 provides commands to the storage mechanism to move discs between storage magazines and player/recorders.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

What is claimed is:

1. A system comprising:
   a first media-disk-receptacle unit operable to receive a media disk;
   a second media-disk-receptacle unit operable to receive the media disk; and
   a disk-manipulator mechanism operable to transport the media disk from the first media-disk-receptacle unit to the second media-disk-receptacle unit, the disk-manipulator mechanism comprising:
   a first arm pivotably connected to a pivot point at a proximal end of the first arm;
   a second arm pivotably connected to a pivot point at a proximal end of the second arm;
   a first wrist section pivotably connected to a distal end of the first arm, the first wrist section having a mounting wheel coupled thereto;
   a second wrist section pivotably connected to a distal end of the second arm, the second wrist section having a mounting wheel coupled thereto; and
   wherein the first-wrist-section mounting wheel and the second-wrist-section mounting wheel interoperably secure the media disk via pressure exerted in a direction defining a chord across the media disk.

2. The system of claim 1, comprising a sensor coupled to the disk-manipulator mechanism, the sensor operable to detect proper positioning of the media disk within the disk-manipulator mechanism.

3. The system of claim 2, comprising:
   a gantry mechanism coupled to the disk-manipulator mechanism and operable to move the disk-manipulator mechanism along at least one axis; and
   a computer electrically connected to the disk-manipulator mechanism and the gantry mechanism.

4. The system of claim 3, wherein the computer is operably coupled to a motor associated with at least one of the disk-manipulator mechanism and the gantry mechanism, and via monitoring of operational characteristics of the motor, determines a position of the disk-manipulator mechanism.

5. The system of claim 3, wherein, responsive to signals provided by the sensor, the computer provides commands to the gantry mechanism and the disk-manipulator mechanism to transport the disk from the first media-disk receptacle unit to the second media-disk receptacle unit.

6. The system of claim 3, wherein the computer runs monitor-and-control software operable to cause the system to record and play the media disk responsive to processing of user or system instructions.

7. The system of claim 6, wherein the monitor-and-control software is operable to provide high-speed cache-searchable cataloging and meta-data labeling of the media disk.

8. The system of claim 3, comprising a plurality of hard drives coupled to the computer and operable to provide buffer storage.

9. The system of claim 1, wherein the disk-manipulator mechanism comprises:
   a motor; and
   a drive belt operatively connecting the motor to the mounting wheels.

10. The system of claim 9, comprising at least one pulley disposed between the first-wrist-section mounting wheel and the second-wrist-section mounting wheel and the motor and operably connected to the first-wrist-section mounting wheel and the second-wrist-section mounting wheel and the motor by the drive belt.

11. The system of claim 1, wherein the first-wrist-section mounting wheel and the second-wrist-section mounting wheel each comprise:
   a top guiding chamfer;
   a tapered throat; and
   a high-traction gripping surface disposed within the tapered throat.

12. The system of claim 11, wherein the tapered throat allows for variation in a thickness of the media disk while not allowing the media disk to contact a bottom of the tapered throat.

13. The system of claim 11, wherein the top guiding chamfer and the tapered throat are fixed relative to one another.

14. The system of claim 1, wherein the first and second wrist sections each have a second mounting wheel coupled thereto, the second mounting wheels each comprising a lower disk-leveling reverse chamfer.

15. The system of claim 1, wherein the media disk is secured within the disk-manipulator mechanism via pressure exerted solely on an outer rim edge of the media disk.

16. The system of claim 1, wherein the first-wrist-section mounting wheel and the second-wrist-section mounting wheel maintain continuous contact with an outer rim edge of the media disk during transport of the media disk from the first media-disk receptacle unit to the second media-disk receptacle unit.

17. The system of claim 1, wherein the first-arm pivot point and the second-arm pivot point are the same pivot point.

18. The system of claim 1, wherein the first wrist section is connected to a top surface of the first arm.

19. The system of claim 1, wherein the second wrist section is connected to a top surface of the second arm.

20. The system of claim 1, further comprising a removable-drawer mechanism having at least one attachment point operable to secure at least one of the first and second media-disk-receptacle units.

21. The system of claim 20, wherein the removable-drawer mechanism comprises a connection to a computer.

22. The system of claim 21, wherein at least one of the first media-disk receptacle unit and the second media-disk-receptacle unit comprises a memory device in continuous communication, via the connection, with the computer.

23. The system of claim 20, wherein at least one of the first media-disk receptacle unit and the second media-disk-receptacle unit is hot-swappable.

24. The system of claim 1, wherein at least one media-disk-receptacle unit of the first media-disk-receptacle unit and the second media-disk-receptacle unit is a removable magazine containing a plurality of media disks.

25. The system of claim 24, wherein each media disk of the plurality of media disks is vertically stacked, within the removable magazine, in a horizontal configuration.

26. The system of claim 24, wherein the removable magazine comprises an inner portion, the inner portion comprising a media-disk separation mechanism.

27. The system of claim 26, wherein the media-disk separation mechanism comprises a plurality of shelves.

28. The system of claim 27, wherein each shelf of the plurality of shelves comprises a chamfered-surface portion operable to enable successful placement of the media disk into a space bounded by the shelf via contact, by the disk-manipulator mechanism or the shelf, solely with an outer rim edge of the media disk.

29. The system of claim 24, wherein the removable magazine comprises a media-disk retention device.

30. The system of claim 29, wherein the media-disk retention device is operable to move to an open position responsive to interaction with a portion of a gantry mechanism.

31. The system of claim 1, wherein at least one media-disk-receptacle unit of the first media-disk-receptacle unit and the second media-disk-receptacle unit is a media disk read/write unit operable to receive the media disk via a slot-loading configuration.

32. The system of claim 1, wherein at least one media-disk-receptacle unit of the first media-disk-receptacle unit and the second media-disk-receptacle unit is a media disk read/write unit is operable to receive the media disk via a drawer-loading configuration.

33. The system of claim 1, wherein:
   the first media-disk-receptacle unit is a removable magazine and the second media-disk-receptacle unit is a media disk read/write unit; and
   recording of the media disk by the media disk read/write unit occurs simultaneously with updating a file index associated with the removable magazine.

34. The system of claim 33, wherein the file index comprises a memory device disposed on the removable magazine.

35. The system of claim 34, wherein the memory device is in communication with and is continuously updated by a computer.

36. The system of claim 33, wherein the file index comprises content information relative to the removable magazine.

37. The system of claim 36, wherein the content information comprises at least one the following types of information: meta-data, key words, images, video frames, and abstracts.

* * * * *